US011219158B2

(12) United States Patent
Hoffman et al.

(10) Patent No.: US 11,219,158 B2
(45) Date of Patent: Jan. 11, 2022

(54) METHOD AND APPARATUS FOR CONTROLLING A BOOM MOWER

(71) Applicant: Venture Products, Inc., Orrville, OH (US)

(72) Inventors: Michael S. Hoffman, Greenwich, OH (US); Corey Gerber, Smithville, OH (US); Ryan Steiner, Dalton, OH (US)

(73) Assignee: Venture Products, Inc., Orrville, OH (US)

( * ) Notice: Subject to any disclaimer, the term of this patent is extended or adjusted under 35 U.S.C. 154(b) by 483 days.

(21) Appl. No.: 16/265,140

(22) Filed: Feb. 1, 2019

(65) Prior Publication Data

US 2020/0245552 A1    Aug. 6, 2020

(51) Int. Cl.
| | |
|---|---|
| *A01D 34/28* | (2006.01) |
| *A01D 34/06* | (2006.01) |
| *A01D 34/14* | (2006.01) |
| *A01D 43/00* | (2006.01) |
| *A01D 34/24* | (2006.01) |
| *A01D 34/38* | (2006.01) |
| *A01D 101/00* | (2006.01) |

(52) U.S. Cl.
CPC .......... *A01D 34/283* (2013.01); *A01D 34/06* (2013.01); *A01D 34/14* (2013.01); *A01D 34/286* (2013.01); *A01D 34/243* (2013.01); *A01D 34/38* (2013.01); *A01D 43/00* (2013.01); *A01D 2101/00* (2013.01)

(58) Field of Classification Search
CPC ...... A01D 34/243; A01D 34/06; A01D 34/14; A01D 34/283; A01D 34/286; A01D 34/38; A01D 43/00; A01D 2101/00
See application file for complete search history.

(56) References Cited

U.S. PATENT DOCUMENTS 4,241,565 A * 12/1980 Parsons, Jr. .......... A01D 34/866
                                                      56/10.7
4,869,056 A *  9/1989 Lynch .................. A01D 34/866
                                                      56/15.2

(Continued)

FOREIGN PATENT DOCUMENTS

JP        2016168007         9/2016
JP        2016168007 A  *    9/2016

(Continued)

*Primary Examiner* — Abigail A Risic
(74) *Attorney, Agent, or Firm* — Sand, Sebolt & Wernow Co., LPA

(57) ABSTRACT

A boom mower attachment that moves a cutting mechanism in a first movement, a second movement, and a third movement by only using two motions of a single control and method of use thereof is provided. The boom mower may include a frame, a boom assembly carried by the frame, a cutting mechanism operably engaged with the boom assembly, and at least one translation assembly operably engaged with the boom assembly and the cutting mechanism that moves the cutting mechanism in one or more of the first movement, the second movement, and the third movement. An implement control system including a control, at least one function switching mechanism, and an implement is also provided. Activation of the control is operative to move the implement in a first mode, a second mode, and a third mode by only using two motions of the control.

19 Claims, 24 Drawing Sheets

(56) References Cited

U.S. PATENT DOCUMENTS

| | | | | |
|---|---|---|---|---|
| 4,887,417 A | * | 12/1989 | Parsons, Jr. | A01D 34/866 56/15.2 |
| 4,912,916 A | * | 4/1990 | Parsons, Jr. | A01D 34/866 56/15.2 |
| 4,956,965 A | * | 9/1990 | Parsons, Jr. | A01D 34/866 56/10.4 |
| 5,375,398 A | * | 12/1994 | McClymonds | A01D 34/866 56/15.2 |
| 5,419,104 A | * | 5/1995 | Higdon | A01D 34/866 56/10.1 |
| 5,511,368 A | * | 4/1996 | Kocher | A01D 34/866 56/15.2 |
| 5,666,794 A | * | 9/1997 | Vought | A01D 41/16 56/15.2 |
| 5,775,075 A | * | 7/1998 | Dannar | A01D 34/866 56/15.2 |
| 9,807,928 B1 | * | 11/2017 | Stout | A01G 3/0426 |
| 2003/0154704 A1 | * | 8/2003 | Dallman | A01D 34/866 56/14.7 |
| 2005/0138911 A1 | * | 6/2005 | Wilson | A01D 34/866 56/14.7 |
| 2006/0090442 A1 | * | 5/2006 | Komiya | A01D 34/74 56/14.7 |
| 2014/0026528 A1 | * | 1/2014 | Thiboutot | A01D 34/03 56/10.7 |
| 2014/0345242 A1 | * | 11/2014 | Carroll | A01D 34/43 56/14.7 |
| 2020/0120872 A1 | * | 4/2020 | Di Biase | A01D 34/86 |
| 2020/0156470 A1 | * | 5/2020 | Stanhope | A01C 7/08 |
| 2020/0390030 A1 | * | 12/2020 | Remillard | A01D 41/06 |
| 2021/0127544 A1 | * | 5/2021 | Ohrstrom | A01B 59/066 |

FOREIGN PATENT DOCUMENTS

| | | |
|---|---|---|
| JP | 2017035050 | 2/2017 |
| JP | 2017035050 A * | 2/2017 |

* cited by examiner

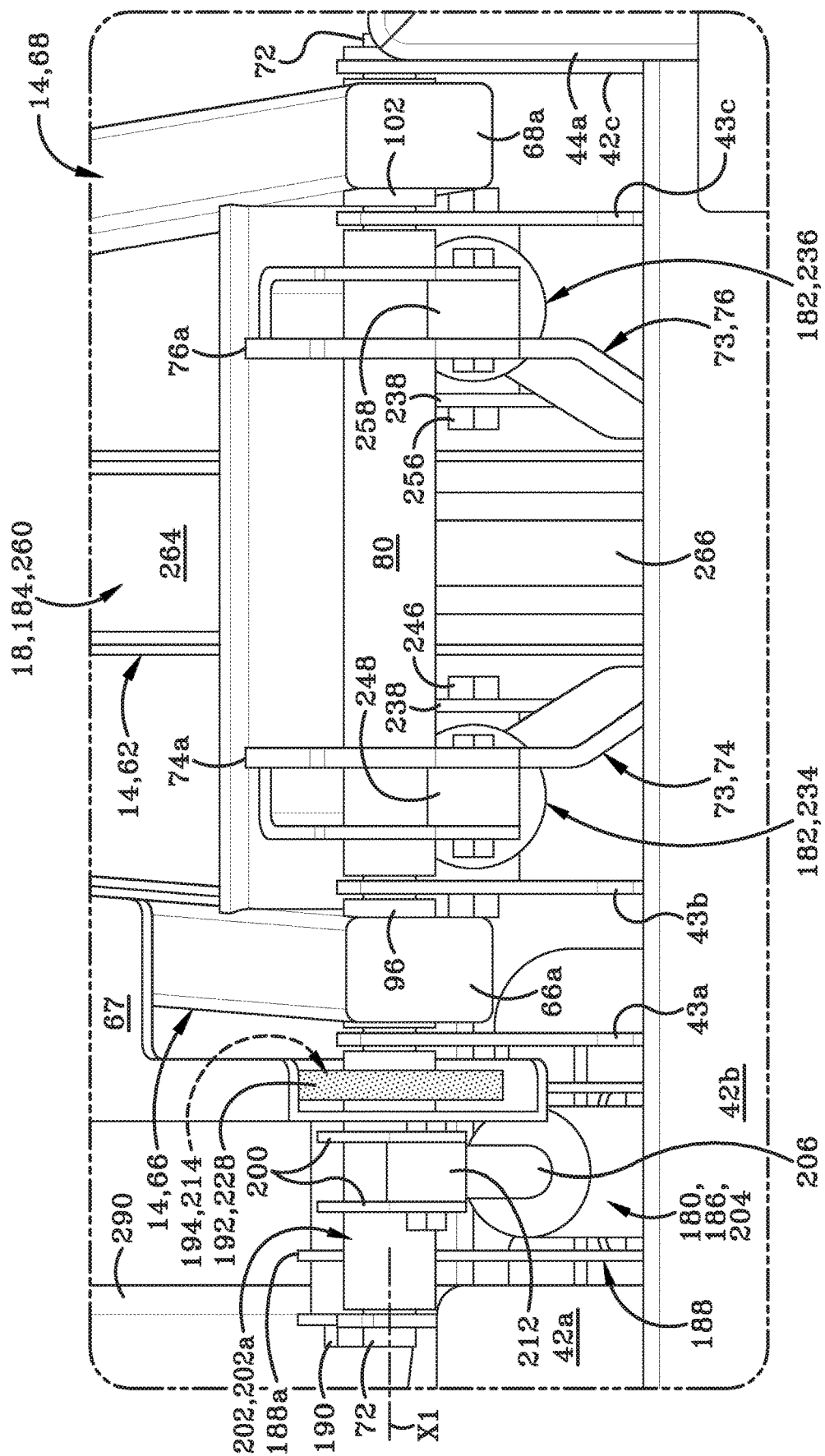

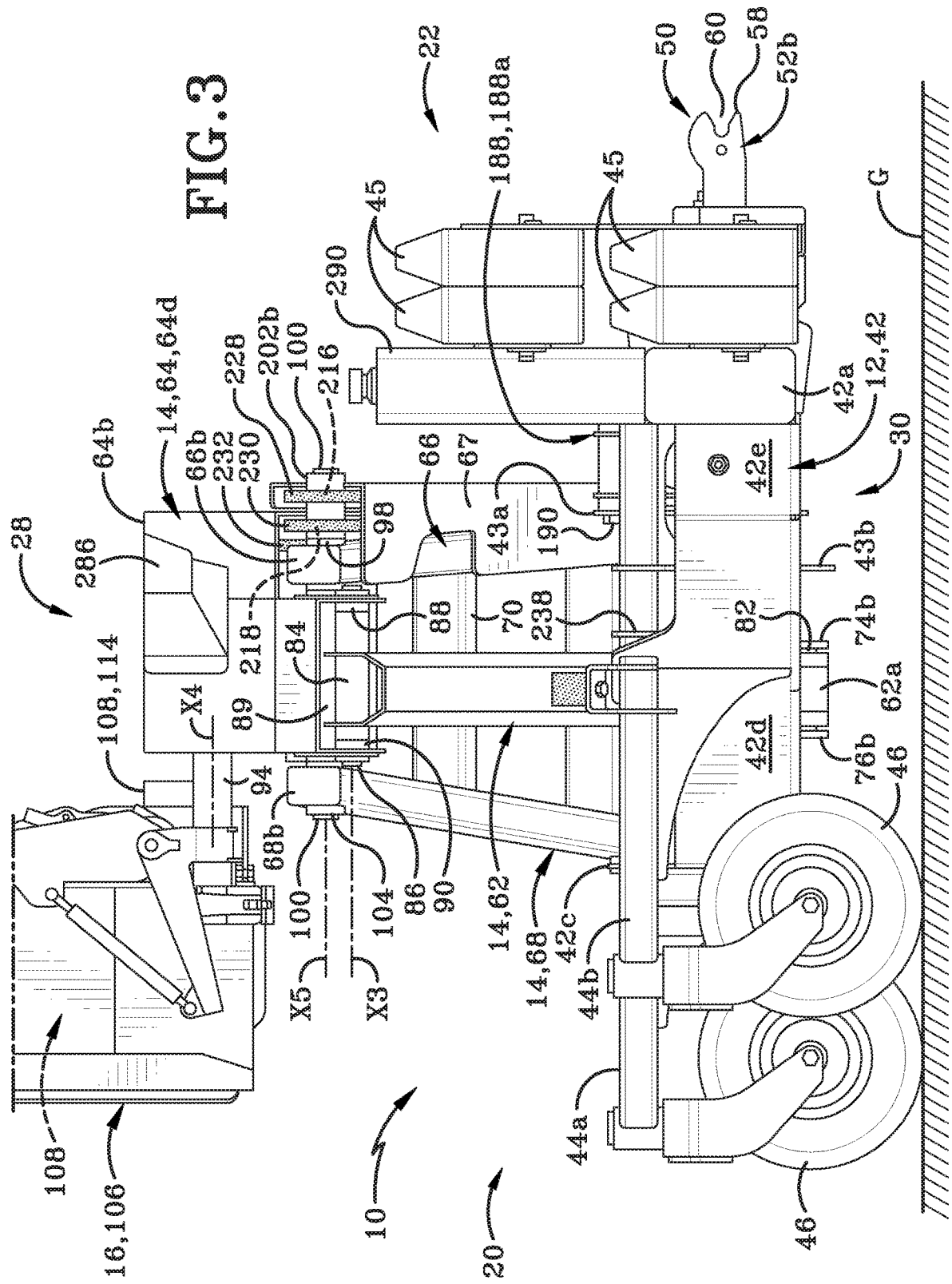

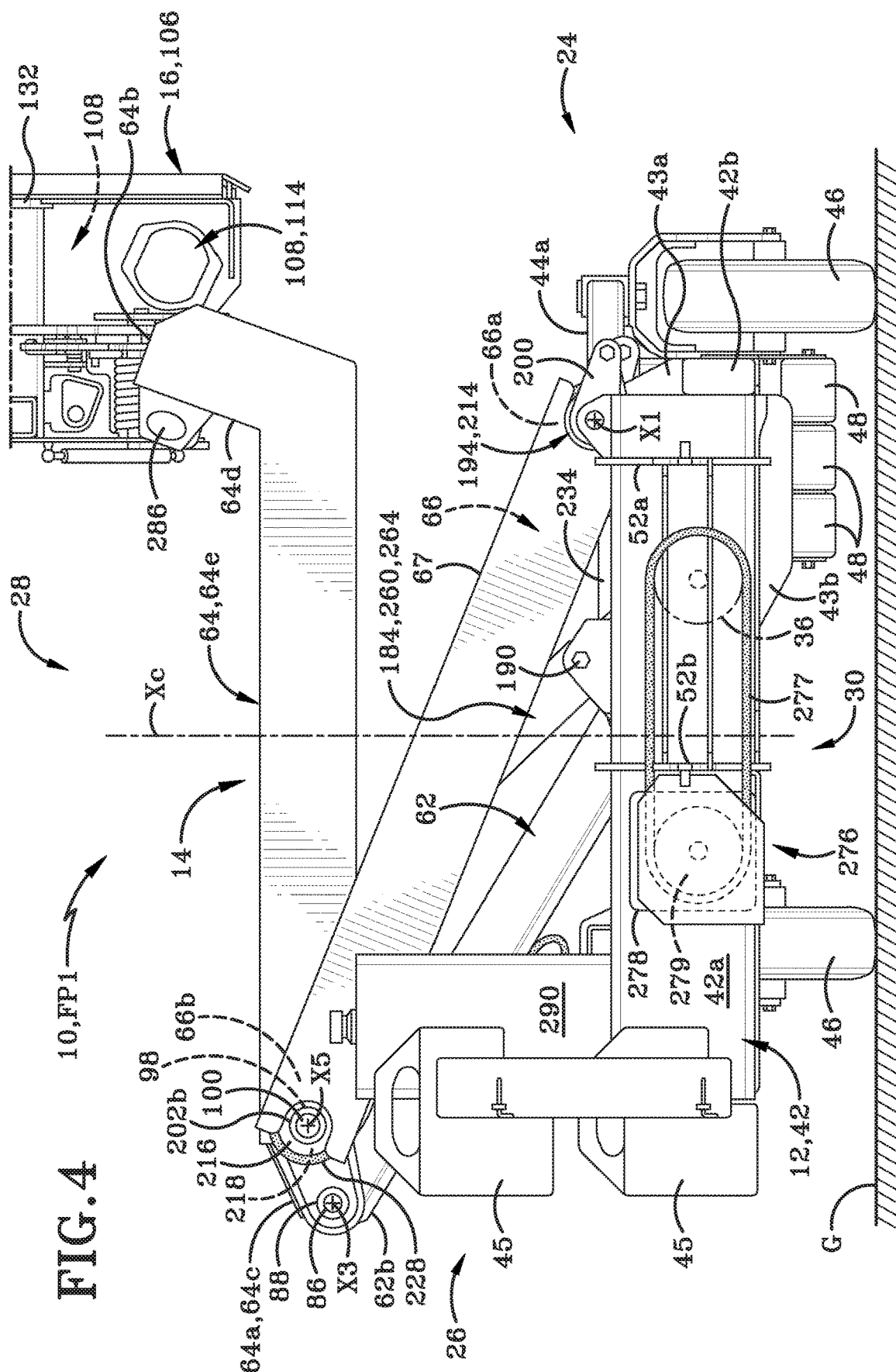

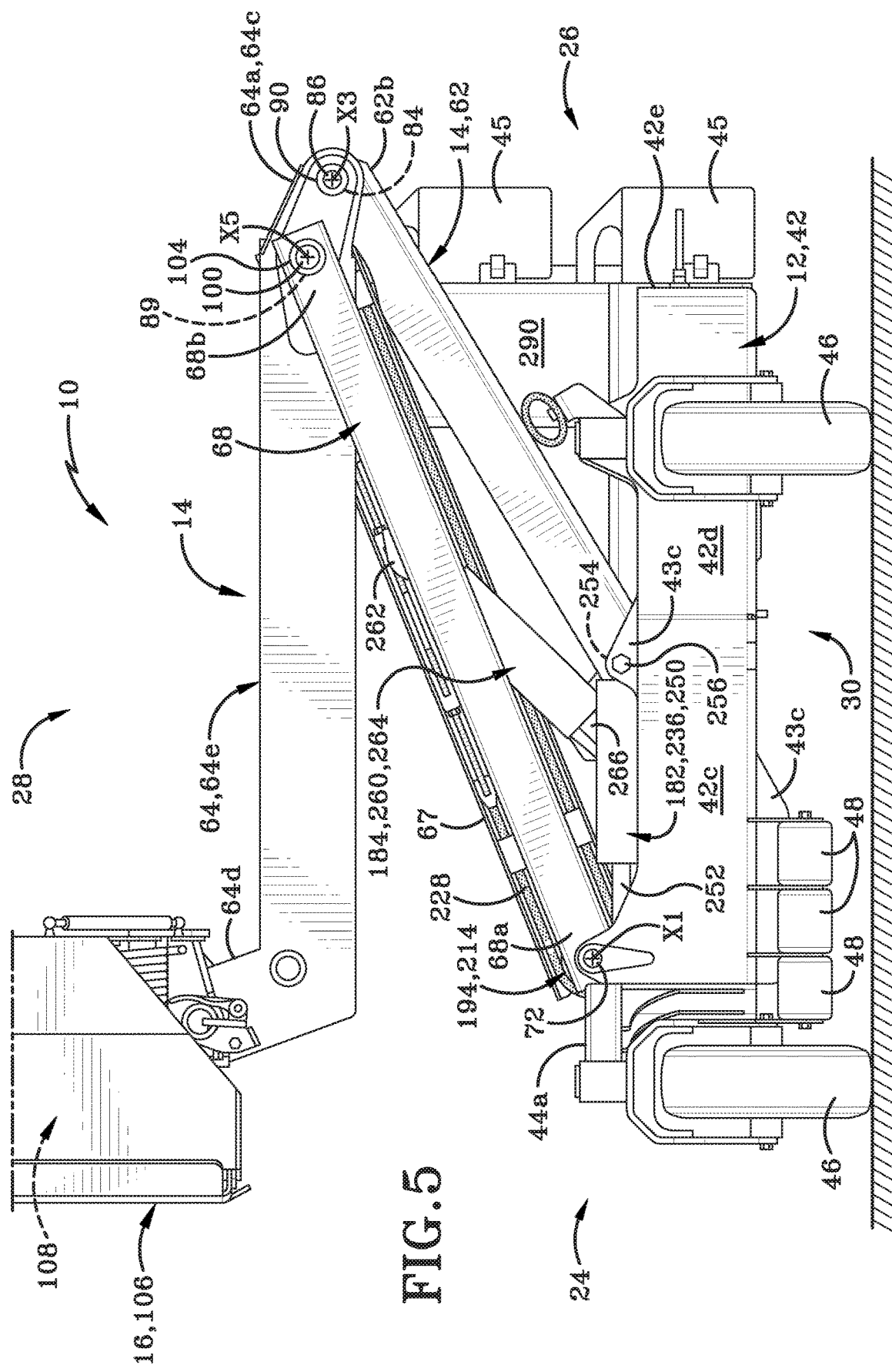

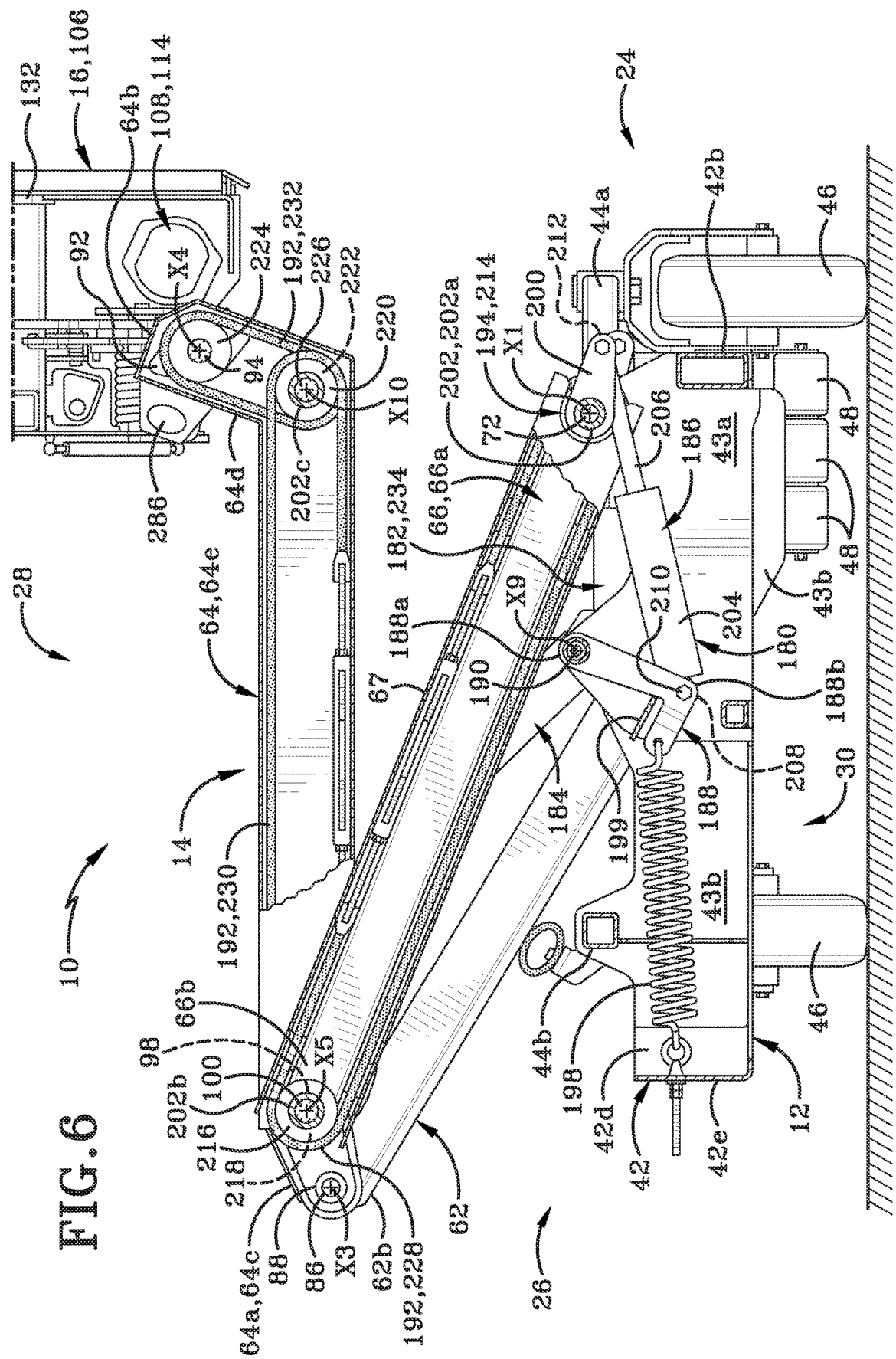

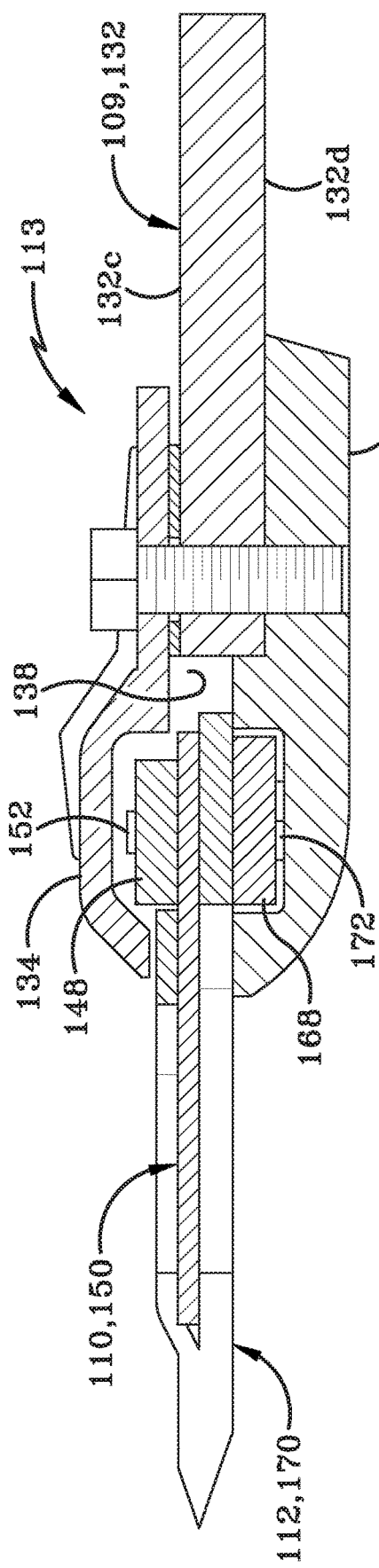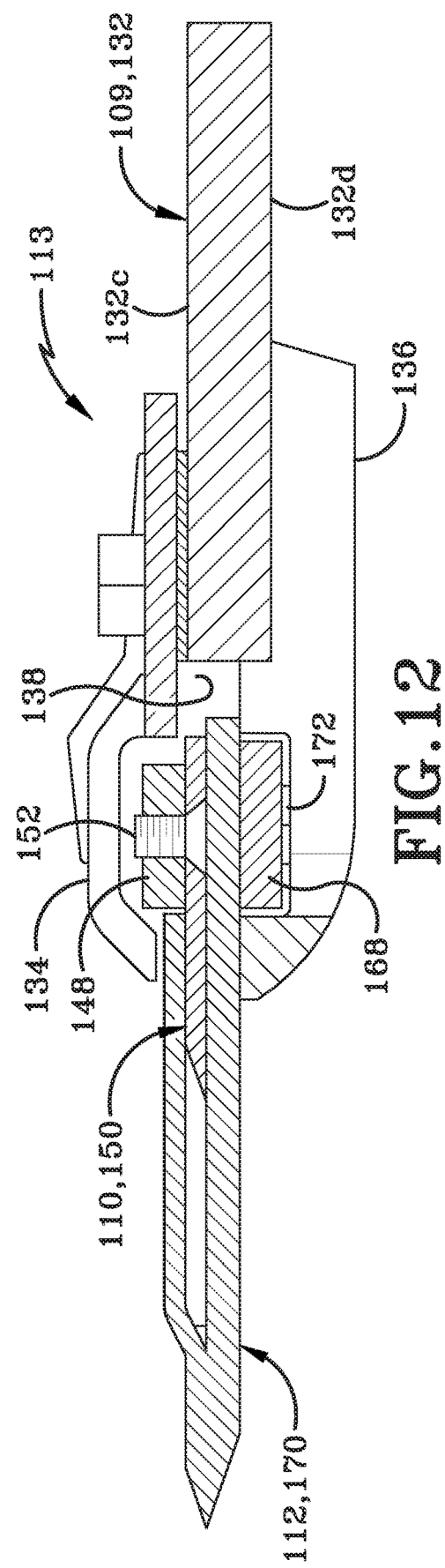

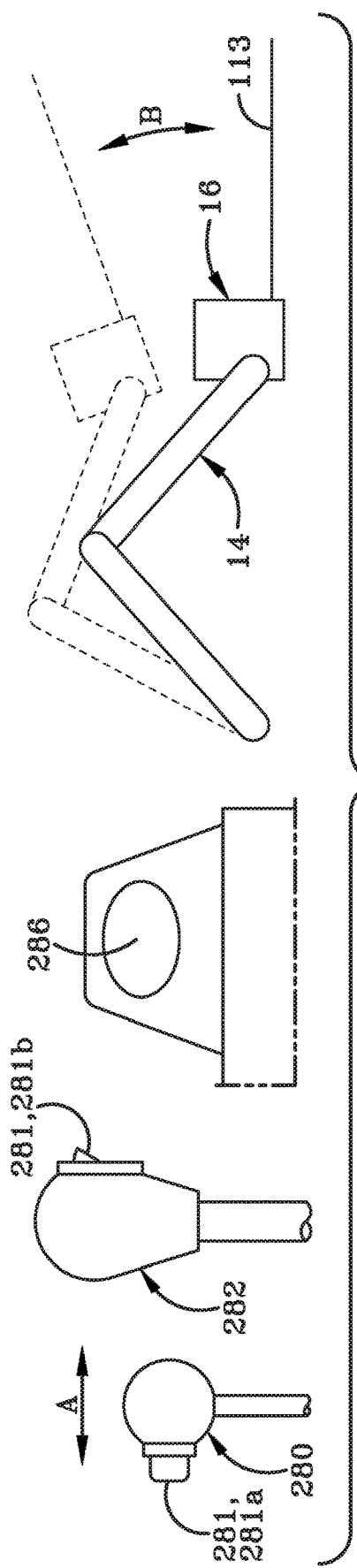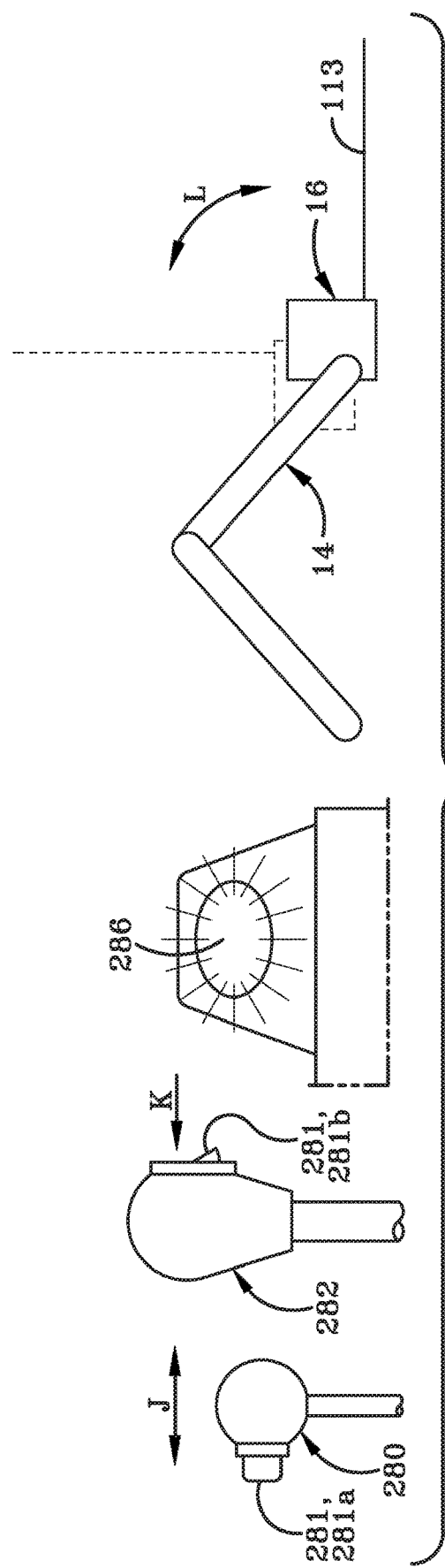

METHOD AND APPARATUS FOR CONTROLLING A BOOM MOWER

BACKGROUND

Technical Field

The present disclosure relates generally to a boom mower. More particularly, the present disclosure relates to a boom mower attachment and a method of use thereof, where the boom mower attachment includes a cutting mechanism that is moved in a first movement, a second movement, and a third movement by only using two motions of a single control.

Background Information

Boom mowers may be attached to landscaping utility vehicles and be utilized to mow and/or cut vegetation such as grasses, shrubs, hedges, and the like. Frequently, the boom mower is mounted to a rear end of the vehicle and is towed behind the vehicle. This arrangement may make it difficult for the operator to monitor the vegetation that is being mowed or cut while driving the tractor forward. In other instances, the boom mower may be mounted to a front end of the vehicle, such as a tractor of around 100 HP or less. Boom mowers are frequently difficult to remove from the vehicle and this limits the use of the vehicle for other purposes. In addition to these issues, previously known boom mowers have had complex operator controls and a limited cutting range.

SUMMARY

The present disclosure relates to a boom mower that is an attachment which is selectively mountable to a front end of a compact tractor. This arrangement allows an operator to see the vegetation that is being mowed or cut while driving the tractor forward. The presently disclosed boom mower is furthermore detachably engageable with the compact tractor and may be removed so that the tractor may be put to other uses. The disclosed boom mower has simplified controls that enable an operator to raise, lower, extend and activate the device with one hand and utilizing a single control. The boom mower is able to be raised, lowered, extended, and retracted to a greater degree than previously known boom mowers.

In one aspect, the present disclosure may provide a boom mower for attachment with a tractor device, the mower comprising: a driver assembly; at least one driven assembly; and a cutting mechanism operably engaged with the at least one driven assembly; wherein the cutting mechanism extends outwardly from the at least one driven assembly; wherein movement of the driver assembly causes movement of the at least one driven assembly; and wherein movement of the at least one driven assembly causes a rotational movement of the cutting mechanism about the at least one driven assembly. The cutting mechanism may have a selectively adjustable rotational orientation; wherein the selectively adjustable rotational orientation of the cutting mechanism remains fixed regardless of any other movement of the cutting mechanism. The driver assembly and the cutting mechanism may rotate in a same rotational direction.

The at least one driven assembly may include a first driven assembly and a second driven assembly; wherein the first driven assembly is operably engaged with the driver assembly and operably engaged with the second driven assembly; wherein the cutting mechanism is operably engaged with the second driven assembly; wherein the rotational movement of the cutting mechanism is about the second driven assembly; wherein movement of the driver assembly causes movement of the first driven assembly and movement of the second driven assembly; and wherein movement of the second driven assembly causes the rotational movement of the cutting mechanism about the second driven assembly. The second driven assembly may include a selectively adjustable rotational orientation and a range of motion; wherein the selectively adjustable rotational orientation of the second driven assembly remains fixed regardless of any other movement of the cutting mechanism. The driver assembly and the cutting mechanism may rotate in a same rotational direction.

The boom mower may further include a driver element operably engaged with the driver assembly; a first driven element operably engaged with the first driven assembly; a second driven element operably engaged with the second driven assembly; wherein the driver element drives the first driven element and the second driven element. The driver element and the second driven element may rotate in a same rotational direction.

The boom mower may further include a boom assembly; wherein the boom assembly is operably engaged with the driver assembly, operably engaged with the at least one driven assembly, and operably engaged with the cutting mechanism; and a selectively adjustable rotational orientation of the cutting mechanism about the at least one driven assembly; wherein the selectively adjustable rotational orientation of the cutting mechanism remains fixed regardless of any other movement of the cutting mechanism. The boom assembly may include a first boom arm and a second boom arm; wherein the at least one driven assembly includes a first driven assembly and a second driven assembly; wherein the first boom arm is operably engaged with the driver assembly, operably engaged with the first driven assembly, and operably engaged with the second boom arm; wherein the second boom arm is operably engaged with the first driven assembly, operably engaged with the second driven assembly, and operably engaged with the cutting mechanism; wherein the cutting mechanism extends outwardly form the second boom arm. The first boom arm and the second boom arm may be configured to move the cutting mechanism in a generally vertical direction relative to the mower and a generally transverse direction relative to the mower; and wherein the selectively adjustable rotational orientation of the cutting mechanism remains fixed regardless of any generally vertical or generally transverse movement of the cutting mechanism.

In another aspect, the present disclosure may provide a boom mower for attachment to a utility vehicle, the boom mower comprising a frame; a boom assembly carried by the frame; a cutting mechanism operably engaged with the boom assembly; a rotational axis; a selectively adjustable rotational orientation of the cutting mechanism about the rotational axis; and at least one translation assembly operably engaged with the boom assembly and the cutting mechanism that selectively moves the cutting mechanism in a generally vertical direction, selectively moves the cutting mechanism in a generally transverse direction, and selectively sets the rotational orientation of the cutting mechanism about the rotational axis; wherein the rotational orientation of the cutting mechanism remains substantially fixed when the cutting mechanism moves in the generally vertical direction; and wherein the rotational orientation of the cutting mechanism remains substantially fixed when the cutting mechanism moves in and the generally transverse direction. The selectively adjustable rotational orientation may include a range of motion of at least approximately ninety degrees. The boom mower may further include a first translation assembly of the at least one translation assembly pivotably coupling a first part of the boom assembly to the frame; a second translation assembly of the at least one translation assembly pivotably coupling a second part of the boom assembly to the frame; and a third translation assembly of the at least one translation assembly pivotably coupling a third part of the boom assembly to the frame and pivotably coupling the boom assembly to the cutting mechanism. The generally vertical movement and the generally transverse movement of the cutting mechanism may be effected by the first translation assembly. Selecting the rotational orientation of the cutting mechanism may be effected by the third translation assembly.

The boom assembly may further include a first boom arm of the boom assembly; a first pivot shaft connecting the boom arm to the frame, the first pivot shaft defining a first pivot axis; a second boom arm of the boom assembly; a second pivot shaft connecting the first boom arm and the second boom arm, the second pivot shaft defining a second pivot axis; and a third pivot shaft connecting the second boom arm to the cutting mechanism, the third pivot shaft defining a third pivot axis. The boom assembly may further include a third boom arm of the boom assembly; a fourth pivot shaft defining a fourth pivot axis; and a fifth pivot shaft defining a fifth pivot axis; wherein the third boom arm is pivotably coupled to the frame along the fourth pivot axis and pivotably coupled to the second boom arm along the fifth pivot axis. The boom assembly may further include a fourth boom arm of the boom assembly; wherein the fourth boom arm is pivotably coupled to the frame along the fourth pivot axis and pivotably coupled to the second boom arm along the fifth pivot axis.

The boom mower may further include a drive assembly of the cutting mechanism; a blade assembly of the cutting mechanism operably engaged with the drive assembly; wherein the blade assembly includes a plurality of blades; and a guard assembly of the cutting mechanism operably engaged with the drive assembly; wherein the guard assembly includes a plurality of guards; and wherein the drive assembly drives the blades and the guards in a linear reciprocating motion. The boom mower may further include a stroke distance of the blades; and a stroke distance of the guards; wherein the stroke distance of the blades and the stroke distance of the guards are optimized to reduce translation of vibration from the cutting mechanism to the frame and thereby to the utility vehicle. The cutting mechanism may further include a cutting plane of the cutting mechanism; wherein the selectively adjustable rotational orientation of the cutting mechanism is defined by the cutting plane. The boom mower may further include an alert mechanism; wherein the alert mechanism indicates when the at least one translation assembly is operably to rotate the cutting mechanism about the rotational axis. The alert mechanism may be an indicator light. The boom mower may further include a belt-driven hydraulic assembly that actuates the cutting mechanism. The boom mower may further include a sickle bar provided on the cutting mechanism. The sickle bar may be a single-action or a double-action sickle bar. The utility vehicle may a compact tractor, the compact tractor including a front end and a rear end; and wherein the boom mower is operably engaged with the front end of the compact tractor. The compact tractor may include an engine horsepower; wherein the engine horsepower is one hundred or less.

In another aspect, the present disclosure may provide a utility vehicle comprising a vehicle frame having a front and a back, a plurality of ground-engaging wheels provided on the frame; a control lever provided on the vehicle in a position accessible to an operator; a cutting mechanism coupled with the vehicle frame; and at least one translation assembly that moves the cutting mechanism in a first movement, a second movement, and a third movement; and wherein the control lever actuates the at least one translation assembly. The cutting mechanism may be positioned forwardly of the front of the vehicle frame. The utility vehicle may further include an alert mechanism that indicates to the operator that the control lever is moving the cutting mechanism in one of the second movement and the third movement. In one example, the alert mechanism may be an indicator light mounted on the cutting mechanism. The utility vehicle may further include a boom assembly that connects the cutting mechanism to the vehicle frame. The boom assembly may be movable between an expanded position and a retracted position. A rotational orientation of the cutting mechanism remains substantially constant regardless of whether the cutting mechanism is moved vertically or transversely.

The boom assembly may include at least a first link member and a second link member that are pivotally engaged with each other. The utility vehicle may include a function switching mechanism operably engaged with the control lever. The function switching mechanism may be one of a button and a switch. The utility vehicle may be a compact tractor.

In another aspect, the present disclosure may provide a method of cutting or mowing vegetation comprising mounting a boom mower attachment to a utility vehicle; operatively engaging a single control on the utility vehicle with the boom mower attachment; moving a cutting mechanism on the boom mower attachment in a first movement, a second movement, and a third movement relative to the boom mower frame utilizing the single control; actuating the cutting mechanism; and cutting or mowing vegetation using the actuated cutting mechanism.

The method may further include moving the control between a first position and a second position in a first mode to cause the cutting mechanism to move in the first movement; switching, via at least one function switching mechanism, a function of the control from the first mode to at least one of (i) a second mode; and (ii) a third mode; and moving the control between the first position and the second position in at least one of (i) the second mode; and (ii) the third mode; wherein the control movement in the second mode is associated with the second movement of the cutting mechanism; and wherein the control movement in the third mode is associated with the third movement of the cutting mechanism.

The method may further include moving at least one blade of the cutting mechanism through a first distance; and moving at least one guard of the cutting mechanism through a second distance. The method may further include optimizing the first distance and the second distance to reduce translation of vibration from the cutting mechanism to the boom mower frame. In one example, the method may include moving either at least one blade or at least one guard through a distance. The method may further include alerting an operator on the utility vehicle when the cutting mechanism is performing one of the second movement and the third movement. Alerting of the operator may include illuminating a light provided on the cutting mechanism. The method may include setting a rotational orientation of the cutting mechanism and maintaining the rotational orientation of the cutting mechanism while moving the cutting mechanism in a generally vertical direction and a generally transverse direction.

In another aspect, the present disclosure may provide an implement control system comprising a control operable in one or more of a first mode, a second mode, and a third mode; at least one function switching mechanism associated with the control; and an implement; wherein activation of the control is operative to move the implement in one or more of a first movement, a second movement, and a third movement by only using two motions of the control; wherein the first mode is associated with the first movement of the implement; wherein the second mode is associated with the second movement of the implement; wherein the third mode is associated with the third movement of the implement; and wherein the at least one function switching mechanism switches the control to one of the second mode and the third mode. The control may be a lever moveable between a first position and a second position. The at least one function switching mechanism may switch the control from the first mode to one of the second mode and the third mode. The at least one function switching mechanism may be one of a depressible button and a switch. The implement control system may further include an alert mechanism that indicates when the control is operating in at least one of (i) the second mode; and (ii) the third mode. In one example, the alert mechanism may be an indicator light on the implement that is viewable by an operator while controlling the control; wherein the indicator light is illuminated to indicate to the operator that the control is operating in the at least one of (i) the second mode; and (ii) the third mode.

The implement control system may further include a first end and a second end defining a longitudinal direction therebetween, a first side and a second side defining a transverse direction therebetween, and a top and a bottom defining a vertical direction therebetween; and a longitudinal center axis extending between the first end and the second end; and wherein the first movement associated with the first mode is a generally vertical movement relative to the longitudinal center axis, the second movement associated with the second mode is a generally transverse movement relative to the longitudinal center axis, and the third movement associated with the third mode is a rotational movement about a rotational axis that is offset parallel to the longitudinal center axis. In one example, the implement control system may be provided on a compact tractor.

In another aspect, the present disclosure may provide a method of using an implement control system comprising moving a control of an implement control system between a first position and a second position in a first mode to cause an implement to move in a first movement; switching, via at least one function switching mechanism, a function of the control from the first mode to at least one of (i) a second mode; and (ii) a third mode; and moving the control between the first position and the second position in at least one of a (i) the second mode; and (ii) the third mode; wherein the control movement in the second mode is associated with a second movement of the implement; and wherein the control movement in the third mode is associated with a third movement of the implement. The at least one function switching mechanism may be a button; and wherein switching, via the at least one function switching mechanism, the function of the control from the first mode to at least one of (i) the second mode; and (ii) the third mode is accomplished by depressing the button. The at least one function switching mechanism may be a switch; wherein switching, via the at least one function switching mechanism, the function of the control from the first mode to at least one of (i) the second mode; and (ii) the third mode is accomplished by activating the switch.

In another example, the at least one function switching mechanism may include a first function switching mechanism and a second function switching mechanism; wherein the first function switching mechanism is a button; wherein the second function switching mechanism is a switch; wherein switching, via the first function switching mechanism, the function of the control to the second mode is accomplished by depressing the button; and wherein switching, via the second function switching mechanism, the function of the control to the third mode is accomplished by activating the switch.

The method may further include indicating, via an alert mechanism, when the function of the control has been switched via the function switching mechanism to at least one of (i) the second mode; and (ii) the third mode. The alert mechanism may be an indicator light and the method may further include illuminating the indicator light when the function of the control has been switched via the function switching mechanism to the at least one of (i) the second mode; and (ii) the third mode. The implement control system may include a first end and a second end defining a longitudinal direction therebetween, a first side and a second side defining a transverse direction therebetween, a top and a bottom defining a vertical direction therebetween, and a longitudinal center axis extending between the first end and the second end; and wherein the first movement comprises moving the implement in a generally vertical movement relative to the longitudinal center axis, the second movement comprises moving the implement in a generally transverse movement relative to the longitudinal center axis, and the third movement comprises moving the implement in a rotational movement about a rotational axis that is offset parallel to the longitudinal center axis.

In another example, the implement control system includes a first end and a second end defining a longitudinal direction therebetween, a first side and a second side defining a transverse direction therebetween, a top and a bottom defining a vertical direction therebetween, and a longitudinal center axis extending between the first end and the second end; and wherein the method may further include one or more of moving the implement in a generally vertical movement relative to the longitudinal center axis; moving the implement in a generally transverse movement relative to the longitudinal center axis; and moving the implement in a rotational movement about a rotational axis that is offset parallel to the longitudinal center axis; and the method may further include activating the control between the first position and the second position in the third mode to cause the implement to rotate about the rotational axis; and setting a rotational orientation of the implement relative to the rotational axis; wherein the rotational orientation of the implement remains substantially fixed when the implement moves generally vertically and generally transversely.

In another aspect, the present disclosure may provide a boom mower attachment that moves a cutting mechanism in a first movement, a second movement, and a third movement by only using two motions of a single control and method of use thereof is provided. The boom mower may include a frame, a boom assembly carried by the frame, a cutting mechanism operably engaged with the boom assembly, and at least one translation assembly operably engaged with the boom assembly and the cutting mechanism that moves the cutting mechanism in one or more of the first movement, the second movement, and the third movement. An implement control system including a control, at least one function switching mechanism, and an implement is also provided. Activation of the control is operative to move the implement in a first mode, a second mode, and a third mode by only using two motions of the control.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2A is an enlarged fragmentary view of a portion of the boom mower highlighted by the dashed box labeled SEE FIG. 2A;

FIG. 3 is a right side elevation view of the boom mower with a portion of the cutting mechanism removed;

FIG. 4 is a rear elevation view of the boom mower with a portion of the cutting mechanism removed;

FIG. 5 is a front elevation view of the boom mower with a portion of the cutting mechanism removed;

FIG. 6 is a cross section view taken along line 6-6 of FIG. 2 with a portion of the cutting mechanism removed;

FIG. 11 is a cross section view taken along line 11-11 of FIG. 9;

FIG. 12 is a cross section view taken along line 12-12 of FIG. 9;

FIG. 18 is an operational diagrammatic view showing movement of the cutting mechanism in accordance with one aspect of the present disclosure;

FIG. 23A is partial rear elevation view of the boom mower with a boom assembly in an extended position;

FIG. 23B is partial rear elevation view of the boom mower showing movement of the cutting mechanism.

Similar numbers refer to similar parts throughout the drawings.

DETAILED DESCRIPTION

Figure 1:
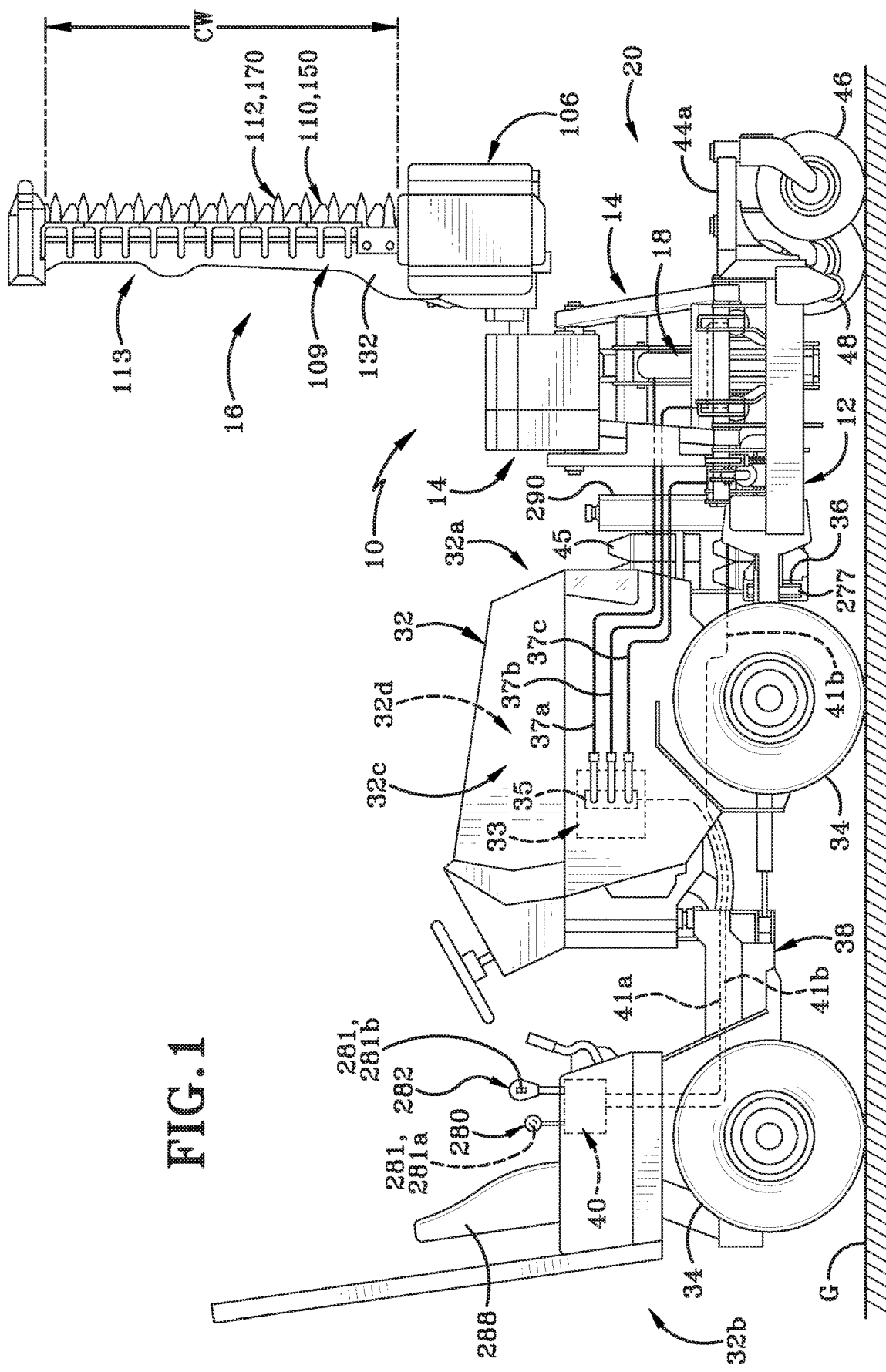
FIG. 1 is a left side elevation view of a boom mower in accordance with the present disclosure attached to a front end of a utility vehicle such as a compact tractor.

FIGS. 1-24 show a landscaping attachment that is selectively engageable with a utility vehicle and is operable to mow or cut vegetation. The landscaping attachment, which may be referred to herein as a "boom mower" is generally indicated by the reference number 10. Boom mower 10 includes a frame 12, a boom assembly 14, a cutting mechanism 16, such as a single-action sickle bar or double action sickle bar, and at least one translation assembly 18. The at least one translation assembly 18 may comprise at least one hydraulic piston and cylinder assembly that is operable to operate boom assembly 14 and/or cutting mechanism 16. The component identified hereafter as the "at least one translation assembly 18" should be understood to be any device that is electrically, pneumatically or hydraulically operable to raise, lower, extend and retract boom assembly 14 and/or activate and deactivate cutting mechanism 16. For example, and not meant as a limitation, the at least one translation assembly may include one or more of a driver assembly, a driven assembly, a driver element, a driven element, or any other suitable device. Still further, and in one particular embodiment, the at least one hydraulic piston and cylinder assembly 18 is operable to move the cutting mechanism 16 in a first movement, a second movement, and a third movement as more fully described below. The at least one hydraulic piston and cylinder assembly 18 may furthermore be operated by a control that may be engaged using a single hand of the operator.

Boom mower 10 includes a first end 20 (FIG. 2), a second end 22 (FIG. 2), a left or first side 24 (FIG. 4), a right or second side 26 (FIG. 4), a top 28 (FIG. 4), and a bottom 30 (FIG. 4). First and second ends 20, 22 define a longitudinal direction therebetween; first and second sides 24, 26 define a transverse direction therebetween, and top and bottom 38, 30 define a vertical direction therebetween. Boom mower further includes a longitudinal center axis $X_C$ that extends between first end 20 and second end 22 as shown in FIG. 4.

Boom mower 10 is configured to be selectively attached to a utility vehicle. The utility vehicle is illustrated to be a compact tractor, generally indicated at 32, but any other suitable drivable vehicles may be utilized. In one example, the compact tractor may be a tractor having an engine horsepower (HP) of one hundred or less. In other examples, the utility vehicle may be a mower, a skid-steer, a truck, or any other suitable vehicle. One exemplary compact tractor 32 for use with boom mower 10 is a VENTRAC® compact tractor commercially available for sale and known in the industry as a VENTRAC® 4500 tractor. ("VENTRAC®" is a registered trademark of Venture Products, Inc. of Orrville, Ohio.)

Referring to FIG. 1, tractor 32 has a front end 32a, a rear end 32b, a left side 32c, a right side 32d, and an articulating frame 38 with a plurality of ground engaging wheels 34 mounted thereon. Tractor 32 further includes a hydraulic system 33 and a power take off (PTO) connector 36. Hydraulic system 33 further includes a hydraulic oil diverter valve 35 which is operably engaged with auxiliary hydraulic circuit lines 37a, 37b, and 37c as more fully described below. In one example, the boom mower 10 is selectively detachably mounted to the front end 32a of tractor 32. (It will be understood that in other examples, boom mower 10 may be selectively mounted to one of the sides 32c, 32d, or to the rear end 32b of tractor 32.) The boom mower 10 is operably engaged with the tractor 32 in any suitable manner. Tractor 32 further includes actuation electronics 40 which are in operable communication with the boom mower 10 via electrical wiring 41a and 41b to power various components of the boom mower 10 as more fully described below.

As depicted in FIG. 2 through FIG. 8, frame 12 includes an outer perimeter wall 42 including a transversely extending first support member 42a, a longitudinally extending second support member 42b, a transversely extending third support member 42c, an angled fourth support member 42d, and a longitudinally extending fifth support member 42e. The transversely extending first support member 42a is provided proximate the rear 22 of the boom mower 10 and is connected to the longitudinally extending second support member 42b on one end and to the longitudinally extending fifth support member 42e on the other end. The longitudinally extending second support member 42b is provided proximate the left side 24 of the boom mower 10 and is connected to the transversely extending first support member 42a on one end and to the transversely extending third support member 42c on the other end. The transversely extending third support member 42c is provided proximate the front 20 of the boom mower 10 and is connected to the longitudinally extending second support member 42b on one end and to the angled fourth support member 42d on the other end. The angled fourth support member 42d extends at an angle away from the transversely extending third support member 42c toward the right side 26 of the boom mower 10 and is connected on one end to the transversely extending third support member 42c and on the other end to the longitudinally extending fifth support member 42e. The longitudinally extending fifth support member 42e is provided proximate the right side 26 of the boom mower and is connected on one end to the angled fourth support member 42d and the longitudinally extending first support member 42a.

The perimeter wall 42 further includes a longitudinally extending sixth support member 42f and the boom mower 10 further includes a transversely extending first support plate 43a, a transversely extending second support plate 43b, a transversely extending third support plate 43c and a plurality of weights 45. The longitudinally extending sixth support member 42f is provided approximately midway between the left side 24 and the right side 26 of the boom mower 10 and is connected to the transversely extending first support member 42a on one end and to the transversely extending third support member 42c on the other end. The transversely extending first support member 42a, the longitudinally extending second support member 42b, the transversely extending third support member 42c, and the longitudinally extending sixth support member 42f define a first interior space and the transversely extending first support member 42a, the transversely extending third support member 42c, the angled fourth support member 42d, and the longitudinally extending fifth support member 42e define a second interior space.

The transversely extending first support plate 43a is connected to the longitudinally extending second support member 42b on one end and to the angled fourth support member 42d on the other end. The transversely extending second support plate 43b is connected to the longitudinally extending second support member 42b on one end and to the angled fourth support member 42d on the other end. The transversely extending third support plate 43c is connected to the longitudinally extending second support member 42b on one end and to the angled fourth support member 42d on the other end. The first support plate 43a is provided intermediate the transversely extending first support member 42a and the second support plate 43b, the second support plate 43b is provided intermediate the first support plate 43a and the third support plate 43c, and the third support plate 43c is provided intermediate the second support plate 43b and the transversely extending third support member 42c. The plurality of weights 45 are provided proximate the rear 22 and the right side 26 of the mower 10 and are utilized to counterbalance at least the boom assembly 14 and the cutting mechanism 16.

The frame 12 of the boom mower 10 further includes a first caster wheel support member 44a and a second caster wheel support member 44b. The first caster wheel support member 44a is provided proximate the connection point between the longitudinally extending second support member 42b and the transversely extending third support member 42c and extends from the connection point generally towards the front 20 of the boom mower 10. The second caster wheel support member 44b is connected to the transversely extending first support member 42a and the angled fourth support member 42d and extends from the transversely extending first support member 42a longitudinally towards the front 20 of the boom mower 10 crossing over approximately midway between the angled fourth support member 42d. One of a plurality of ground-engaging caster wheels 46 may be pivotably attached to a leading end of the first caster wheel support member 44a and one of the plurality of ground-engaging caster wheels 46 may be pivotably attached to a leading end of the second caster wheel support member 44b. At least one roller 48 is provided on the transversely extending third support member 42c and extends generally from the connection point between the longitudinally extending second support member 42b and the transversely extending third support member 42c transversely along a portion of the transversely extending third support member 42c. The roller 48 may be supported by an axle rotatably connected with the transversely extending third support member 42c. Roller 48 engages the ground when the boom mower 10 passes over uneven terrain.

Figure 2:
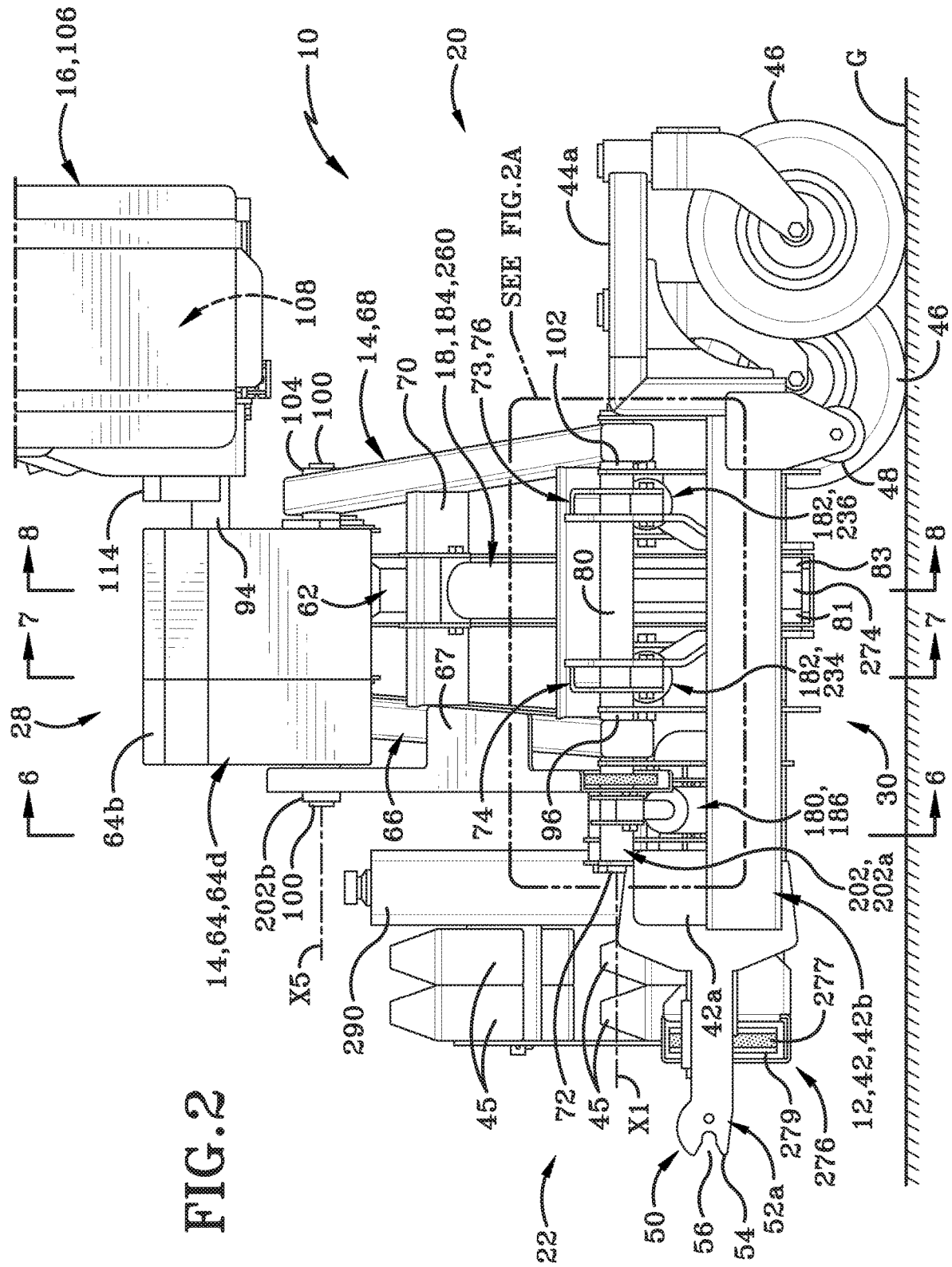
FIG. 2 is a left side elevation view of the boom mower with a portion of a cutting mechanism of the boom mower removed.

As shown in FIG. 2 and FIG. 3, frame 12 of boom mower 10 further includes a hitch assembly 50 having a first hitch arm 52a and a second hitch arm 52b. The hitch assembly 50 is engaged to the transversely extending first support member 42a and extends longitudinally toward the rear 22 of the boom mower 10. The first hitch arm 52a is provided generally proximate the left side 24 of the boom mower 10 while the second hitch arm 52b is provided generally proximate midway between the left side 24 and the right side 26 of the boom mower 10. First hitch arm 52a includes a leading end 54 which defines a connection cutout 56. Second hitch arm 52b includes a leading end 58 which defines a connection cutout 60. Connection cutouts 56 and 60 are configured to be selectively detachably engaged with the tractor 32 to effectuate the connection between the boom mower 10 and a portion of the tractor 32. In one particular embodiment, when the boom mower 10 is engaged with the tractor 32, the connection cutouts 56 and 60 on boom mower 10 are positioned rearwardly from the power takeoff connector 36 of tractor 32.

The boom assembly 14 of boom mower 10 includes a generally elongated first link member 62, which may also be referred to as a first boom arm, a generally elongated second link member 64, which may also be referred to as a second boom arm, a generally elongated third link member 66, which may also be referred to as a third boom arm, a shield 67, a generally elongated fourth link member 68, which may also be referred to as a fourth boom arm, and a support beam 70. The boom assembly 14 is operably engaged with a pivot axis X1 defined by a first pivot shaft 72 as more fully described below. The first pivot shaft 72 extends longitudinally between the transversely extending first support member 42a and the transversely extending third support member 42c proximate to but offset from the longitudinally extending second support member 42b and is supported by the first support plate 43a, the second support plate 43b, and the third support plate 43c.

The first link member 62 includes a first end 62a and a second end 62b. The second link member 64 includes a first end 64a, a second end 64b, a first angled portion 64c proximate the first end 64a, a second angled portion 64d proximate the second end 64b, and a generally straight portion 64e intermediate the first angled portion 64c and the second angled portion 64d. The third link member 66 includes a first end 66a and a second end 66b. The fourth link member 68 includes a first end 68a and a second end 68b. The first link member 62, the third link member 66, and the fourth link member 68 are pivotably connected to a mounting bracket 73, such as a rocker arm assembly, as more fully described below. The mounting bracket 73 includes a first arm 74 longitudinally spaced apart from a second arm 76. The first arm 74 includes a top end 74a and a bottom end 74b and the second arm 76 includes a top end 76a and a bottom end 76b. The top end 74a of the first arm 74 and the top end 76a of the second arm 76 are fixedly connected to a first sleeve 80. The first sleeve 80 is rotatably connected to the first pivot shaft 72.

The first end 62a of the first link member 62 is pivotably connected to the first arm 74 and the second arm 76 of the mounting bracket 73 proximate the bottom end 74b of the first arm 74 and the bottom end 76b of the second arm 76 via second sleeve 81 and third sleeve 83 which are pivotably connected to a second pivot shaft 82 which defines a second pivot axis X2. The second pivot shaft 82 extends between the first arm 74 and the second arm 76 proximate the bottom end 74b of the first arm 74 and the bottom end 76b of the second arm 76. The second end 62b of the first link member 62 is fixedly connected to a fourth sleeve 84 which is rotatably connected to a third pivot shaft 86 which defines a third pivot axis X3. One end of the first angled portion 64c of the second link member 64 is fixedly connected to a fifth sleeve 88 and a sixth sleeve 90 which are rotatably connected to the third pivot shaft 86. Therefore, the first link member 62 and the second link member 64 are pivotably connected to one another about the third pivot axis X3. One end of the second angled portion 64d of the second link member 64 is fixedly connected to a pair of bearings 92 which are rotatably attached to a fourth pivot shaft 94 which defines a fourth pivot axis X4. The fourth pivot shaft 94 extends longitudinally through the second angled portion 64d. The first end 66a of the third link member 66 is fixedly connected to a seventh sleeve 96 which is rotatably connected to the first pivot shaft 72. The other end of the first angled portion 64c of the second link member 64 is fixedly connected to an eighth sleeve 89 which is rotatably connected to a fifth pivot shaft 100 which defines a fifth pivot axis X5. The second end 66b of the third link member 66 is fixedly connected to a ninth sleeve 98 which is rotatably connected to the fifth pivot shaft 100. The first end 68a of the fourth link member 68 is fixedly connected to a tenth sleeve 102 which is rotatably connected to the first pivot shaft 72. The second end 68b of the fourth link member 68 is fixedly connected to an eleventh sleeve 104 which is rotatably connected to the fifth pivot shaft 100. Alternatively, the ninth sleeve 98 and the eleventh sleeve 104 may be rotatably connected to the fifth pivot shaft 100. The third link member 66 is positioned a distance away from the fourth link member 68 and is generally coplanar with the fourth link member 68. The support beam 70 is connected on one end to the third link member 66 and on the other end to the fourth link member 68 via welding or any other suitable manner. The support beam 70 extends longitudinally between the third link member 66 and the fourth link member 68. Although support beam 70 has been illustrated, it is to be understood that additional support beams may be utilized in any suitable manner.

The cutting mechanism 16 of the boom mower 10 includes a housing 106, a drive assembly 108, a frame assembly 109, a blade assembly 110, and a guard assembly 112. The housing 106 includes a front side 106a, a rear side 106b, a left side 106c, a right side 106d, a top 106e, and a bottom 106f. The housing 106 is engaged with the fourth pivot shaft 94 of the boom mower 10. The fourth pivot shaft 94 extends longitudinally through the left side 106c of the housing 106 proximate the rear side 106b of the housing 106. As such, the cutting mechanism 16 is rotatable about the fourth pivot axis X4 as more fully described below.

The drive assembly 108 of the cutting mechanism 16 includes a hydraulic motor 114 for driving the drive assembly 108 as more fully described below. Although a hydraulic motor has been described as driving the drive assembly 108, it is to be understood that any suitable device may be used to drive the drive assembly 108, including, but not limited to a pneumatic motor. Hydraulic motor 114 includes a drive shaft 116a and an end drive shaft 116b. The drive shaft 116a is provided proximate the left side 106c of the housing 106 and the end drive shaft 116b is coplanar with the drive shaft 116a and provided a distance away from the drive shaft 116a. The motor 114 is provided offset from the fourth pivot shaft 94 and is operably engaged with the drive shaft 116a which defines a sixth pivot axis X6 that extends in a longitudinal direction. The drive assembly 108 further includes a first crankshaft 118, a second crankshaft 120, a first crankshaft plate 122, a second crankshaft plate 124, a third crankshaft plate 126, a first crankshaft rod 128, and a second crankshaft rod 130. The first crankshaft rod 128 includes a first end 128a and a second end 128b. The first end 128a of the crankshaft rod 128 is a sleeve that is rotatably engaged with the first crankshaft 118. The first crankshaft 118 includes a center axis 118*a* that is a distance R1 away from the sixth pivot X6. The second crankshaft rod 130 includes a first end 130*a* and a second end 130*b*. The first end 130*a* of the crankshaft rod 130 is a sleeve that is rotatably engaged with the second crankshaft 120. The second crankshaft 120 includes a center axis 120*a* that is a distance R2 away from the sixth pivot axis X6. The first crankshaft plate 122 is operably engaged with the drive shaft 116*a* on one side and with the first crankshaft rod 128 on the other side via the first crankshaft 118. The first crankshaft rod 128 is connected to the first crankshaft plate 122 on one side via the first crankshaft 118 and with the second crankshaft plate 124 on the other side via the first crankshaft 118. The second crankshaft rod 130 is connected to the second crankshaft plate 124 on one side via the second crankshaft 120 and with the third crankshaft plate 126 on the other side via the second crankshaft 120. The third crankshaft plate is connected to the second crankshaft rod 130 on one end via the second crankshaft 120 and with the end shaft 116*b* on the other side. As such, the first crankshaft rod 128 is intermediate the first crankshaft plate 122 and the second crankshaft plate 124 and the second crankshaft rod 130 is intermediate the second crankshaft plate 124 and the third crankshaft plate 126.

Figure 13:
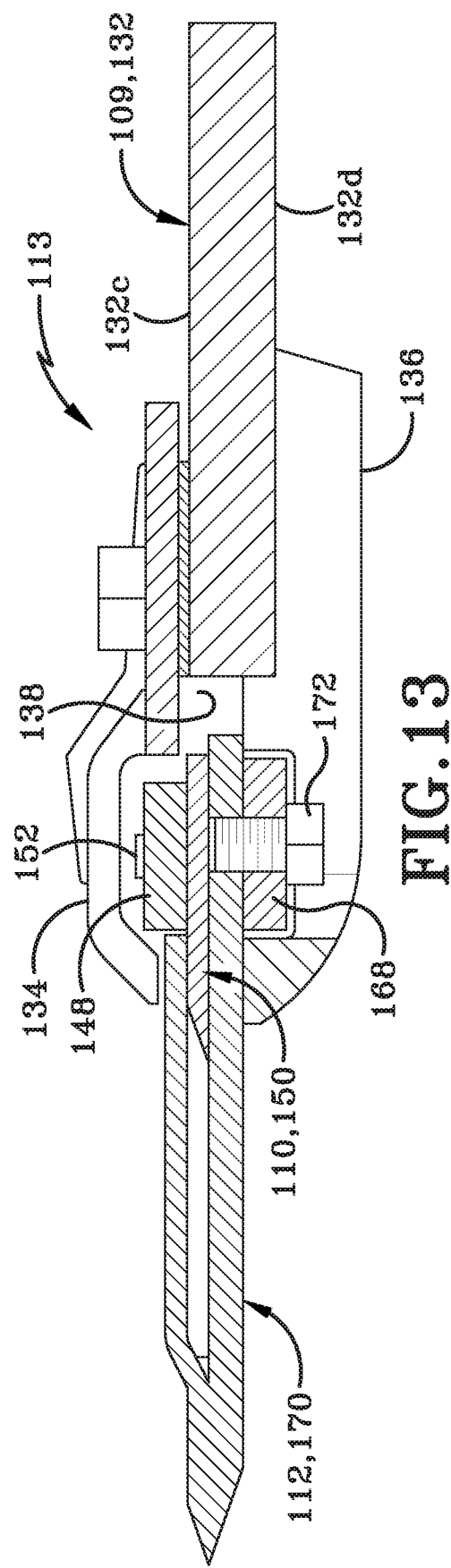
FIG. 13 is a cross section view taken along line 13-13 of FIG. 10.
Figure 14:
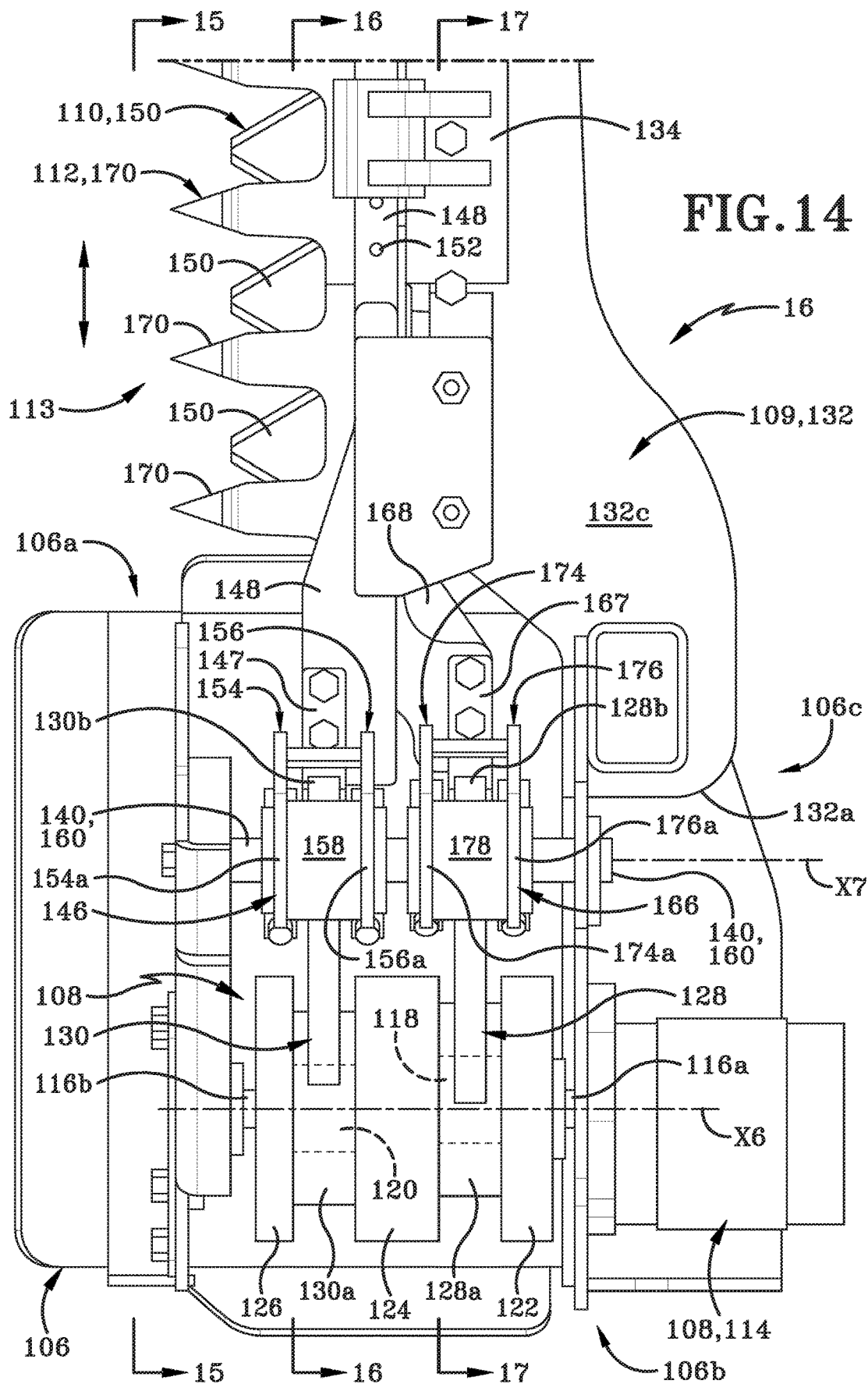
FIG. 14 is an enlarged fragmentary view of the cutting mechanism with parts removed for clarity.
Figure 15:
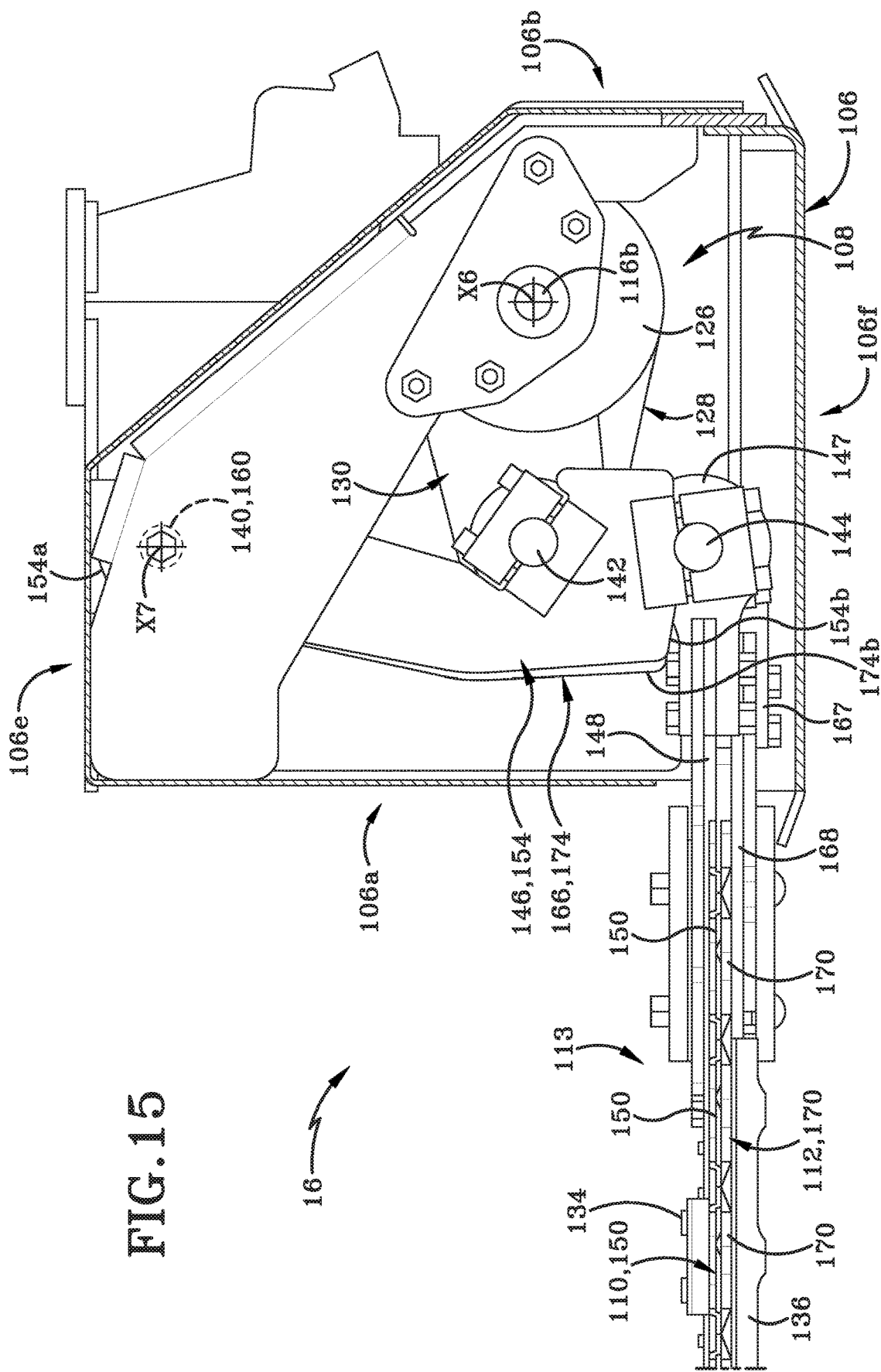
FIG. 15 is a cross section view taken along line 15-15 of FIG. 14.

The frame assembly 109 (FIG. 14) of the cutting mechanism 16 includes a main frame member 132 (FIG. 11-FIG. 14), a top cover 134 (FIGS. 11-14), and a bottom cover 136 (FIGS. 11-13 and FIG. 15). The main frame member 132 includes a first end 132*a*, a second end 132*b*, a top 132*c*, and a bottom 132*d*. The first end 132*a* is connected to the front side 106*a* of the housing 106 and extends away from the front side 106 of the housing a distance. The top cover 134 is connected to the top 132*c* of the main frame member 132 and the bottom cover 136 is connected to the bottom 132*d* of the main frame member 132. The main frame member 132, the top cover 134, and the bottom cover 136 define a space 138 as shown in FIG. 11, FIG. 12, and FIG. 13.

The blade assembly 110 of the cutting mechanism 16 includes a first blade assembly shaft 140 (FIG. 14), a second blade assembly shaft 142 (FIG. 15), a third blade assembly shaft 144 (FIG. 15), a blade rocker arm assembly 146 (FIG. 14-FIG. 15), a connector 147 (FIG. 15), a blade plate 148 (FIG. 11-FIG. 15), a plurality of blades 150 (FIG. 14) and a plurality of fastening mechanisms 152 (FIG. 14), such as bolts or the like. The first blade assembly shaft 140 is provided proximate the top 106*e* of the housing 106 and defines a seventh pivot axis X7 which extends longitudinally between the left side 106*c* and the right side 106*d* of the housing 106. The blade rocker arm assembly 146 includes a first blade rocker arm 154, a second blade rocker arm 156, and a blade rocker arm sleeve 158. The first blade rocker arm 154 includes a top 154*a* and a bottom 154*b* and the second blade rocker arm 156 includes a top 156*a* and a bottom 156*b*. The first blade rocker arm 154 is spaced longitudinally from the second guard rocker arm 156. The top 154*a* of the first blade rocker arm 154 and the top 156*a* of the second blade rocker arm 156 are connected to the blade rocker arm sleeve 158 which is rotatably connected to the first blade assembly shaft 140. The first blade rocker arm 154 and the second guard rocker arm 156 are rigidly connected to the second blade assembly shaft 142 proximate the bottom 154*b* of the first blade rocker arm 154 and the bottom 156*b* of the second blade rocker arm 156 and the second blade assembly shaft 142 is connected to the second crankshaft rod 130. The first blade rocker arm 154 and the second blade rocker arm 156 are rigidly connected to the third blade assembly shaft 144 proximate the bottom 154*b* of the first blade rocker arm 154 and the bottom 156*b* of the second blade rocker arm 156 and the third blade assembly shaft 144 is rigidly connected to the blade plate 148 via the connector 147. The second blade assembly shaft 142 is linked with the second crankshaft 120 via the second crankshaft rod 130 which is in turn linked with the drive shaft 116*a*. Therefore, the second blade assembly shaft 142 and the third blade assembly shaft 144 are linked and the second blade assembly 142 and the second crankshaft 120 are linked. The blade plate 148 extends longitudinally within the space 138 defined by the main frame 132, the top cover 134, and the bottom cover 136. The blade plate 148 is connected to the plurality of blades 150 via the plurality of fastening mechanisms 152 (FIG. 12).

The guard assembly 112 of the cutting mechanism 16 includes a first guard assembly shaft 160 (FIG. 17), which, in this embodiment, is the same shaft as the first blade assembly shaft 140, a second guard assembly shaft 162 (FIG. 17), a third guard assembly shaft 164 (FIG. 17), a guard rocker arm assembly 166 (FIG. 14 and FIG. 17), a connector 167 (FIG. 17), a guard plate 168 (FIG. 17), a plurality of guards 170 (FIG. 14) and a plurality of fastening mechanisms 172 (FIG. 14), such as bolts or the like. The guard rocker arm assembly 166 includes a first guard rocker arm 174, a second guard rocker arm 176, and a guard rocker arm sleeve 178. The first guard rocker arm 174 includes a top 174*a* and a bottom 174*b* and the second guard rocker arm 176 includes a top 176*a* and a bottom 176*b*. The first guard rocker arm 174 is spaced longitudinally from the second guard rocker arm 176. The top 174*a* of the first guard rocker arm 174 and the top 176*a* of the second guard rocker arm 176 are connected to the guard rocker arm sleeve 178 which is rotatably connected to the first guard assembly shaft 160. The first guard rocker arm 174 and the second guard rocker arm 176 are rigidly connected to the second guard assembly shaft 162 proximate the bottom 174*b* of the first guard rocker arm 174 and the bottom 176*b* of the second guard rocker arm 176 and the second guard assembly shaft 162 is connected to the first crankshaft rod 128. The first guard rocker arm 174 and the second guard rocker arm 176 are rigidly connected to the third guard assembly shaft 164 proximate the bottom 174*b* of the first guard rocker arm 174 and the bottom 176*b* of the second guard rocker arm 176 and the third guard assembly shaft 164 is rigidly connected to the guard plate 168 via the connector 167. The second guard assembly shaft 162 is linked with the first crankshaft 118 via the first crankshaft rod 128 which is in turn linked with the drive shaft 116*a*. Therefore, the second guard assembly shaft 162 and the third guard assembly shaft 164 are linked and the second guard assembly 162 and the first crankshaft 118 are linked. The guard plate 168 extends longitudinally within the space 138 defined by the main frame 132, the top cover 134, and the bottom cover 136. The guard plate 168 is connected to the plurality of guards 170 via the plurality of fastening mechanisms 172 (FIG. 13).

The at least one hydraulic piston and cylinder assembly 18 includes a first hydraulic piston and cylinder assembly 180, which may be referred to as a first translation assembly, a second hydraulic piston and cylinder assembly 182, which may be referred to as a second translation assembly, and a third hydraulic piston and cylinder assembly 184, which may be referred to as a third translation assembly. In one particular embodiment, the first hydraulic piston and cylinder assembly 180 translates or moves the cutting mechanism 16 in a first movement, the second hydraulic piston and cylinder assembly 182 translates or moves the cutting mechanism 16 in a second movement, and the third hydraulic piston and cylinder assembly 184 moves the cutting mechanism 16 in a third movement. The first hydraulic piston and cylinder assembly 180 includes a first hydraulic piston and cylinder device 186 (FIG. 6), a pivot arm 188 (FIG. 6), a pivot shaft 190 (FIG. 6), a plurality of translation devices 192 (FIG. 6), such as a metal chains, a plurality of drive structures 194 (FIG. 6), which may also be referred to as driver elements and/or driven elements dependent upon the particular context, such as sprockets, a vertical/rotational break-away mechanism 198 (FIG. 6), such as a spring also denoted as 198, an end plate 199 (FIG. 6), a hanger bracket 200 (FIG. 6), and a plurality of sleeves 202 (FIG. 6). In one particular embodiment, the plurality of sleeves includes a first sleeve 202a, a second sleeve 202b, and a third sleeve 202c.

With primary reference to FIG. 6, the first hydraulic piston and cylinder device 186 includes a cylinder 204 and a piston 206. The pivot arm 188 includes a top 188a and a bottom 188b and is generally L-shaped. The top 188a of the pivot arm 188 is rotatably connected to the pivot shaft 190 which is mounted to the transversely extending first support member 42a of the frame 12. The pivot shaft 190 defines a ninth axis X9 extending in a longitudinal direction. With primary reference to FIG. 6, the cylinder 204 includes a trailing end 208 pivotably connected with the pivot arm 188 proximate one end of the bottom 188b of the pivot arm 188 via a longitudinally extending bolt 210. The other end of the bottom 188b of the pivot arm 188 is connected to the spring 198 which keeps the pivot arm 188 as well as the first hydraulic piston and cylinder assembly 186 in contact with the end plate 199. In one example, the spring 198 allows the cutting mechanism 16 to better follow the contours of the ground G, in certain applications, without additional actuation from the operator. The piston 206 includes a leading end 212 that is freely connected to the hanger bracket 200. The hanger bracket 200 is connected to the first sleeve 202a and the first sleeve 202a is rotatably connected to the first pivot shaft 72.

With primary reference to FIG. 3 and FIG. 6, and in one particular embodiment, the plurality of sprockets 194 includes a first sprocket 214, a second sprocket 216, a third sprocket 218, a fourth sprocket 220, a fifth sprocket 222, and a sixth sprocket 224. The first sprocket 214 is connected to the first sleeve 202a proximate the leading end 212 of the piston 206 and the first sleeve 202a is rotatably connected to the first pivot shaft 72. The second sprocket 216 is connected to the second sleeve 202b which is rotatably connected to the fifth pivot shaft 100. The third sprocket 218 is connected to the second sleeve 202b proximate the second sprocket 216. The fourth sprocket 220 is connected to the third sleeve 202c which is rotatably connected to a sprocket shaft 226 which extends in a longitudinal direction and defines a tenth pivot axis X10. The fifth sprocket 222 is connected to the third sleeve 202c proximate the fourth sprocket 220. The sixth sprocket 224 is connected to the fourth pivot shaft 94.

With primary reference to FIG. 6, the plurality of translation devices 192 includes a first chain 228, a second chain 230, and a third chain 232. The first chain 228 is operably engaged with the first sprocket 214 and the second sprocket 216, the second chain 230 is operably engaged with the third sprocket 218 and the fourth sprocket 220, and the third chain 232 is operably engaged with the fifth sprocket 222 and the sixth sprocket 224.

Figure 7:
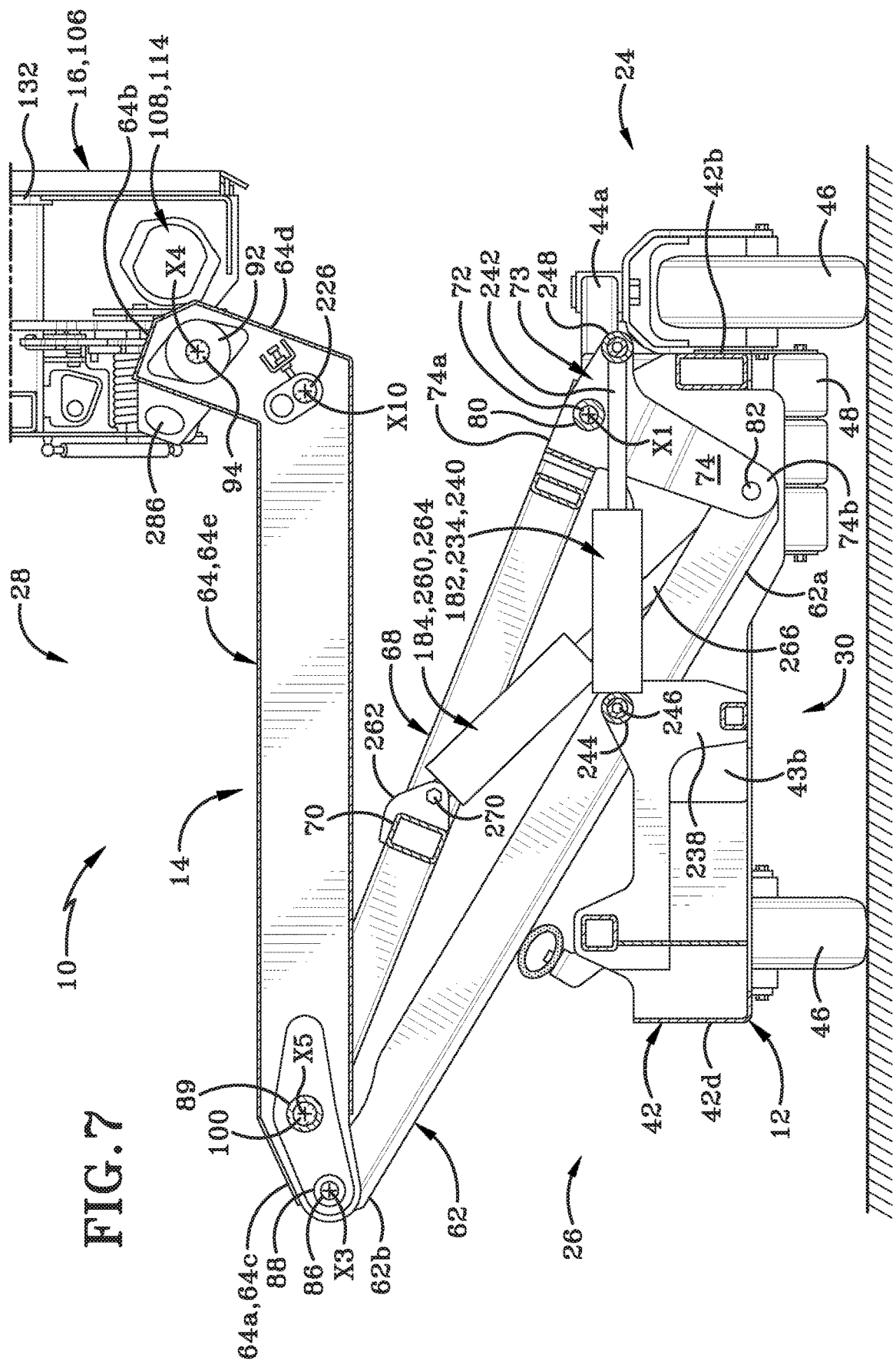
FIG. 7 is a cross section view taken along line 7-7 of FIG. 2 with a portion of the cutting mechanism removed.
Figure 8:
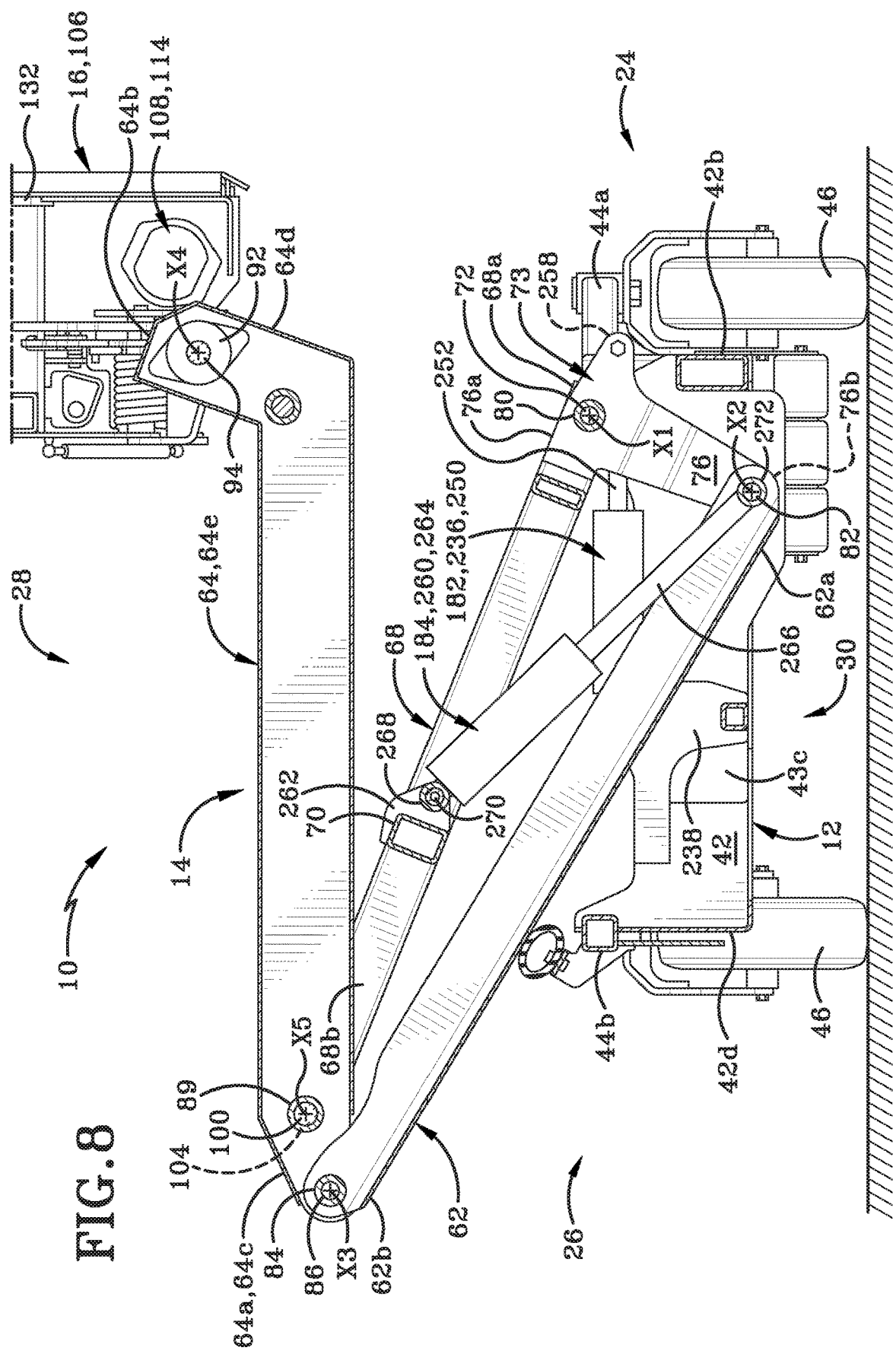
FIG. 8 is a cross section view taken along line 8-8 of FIG. 2 with a portion of the cutting mechanism removed.
Figure 9:
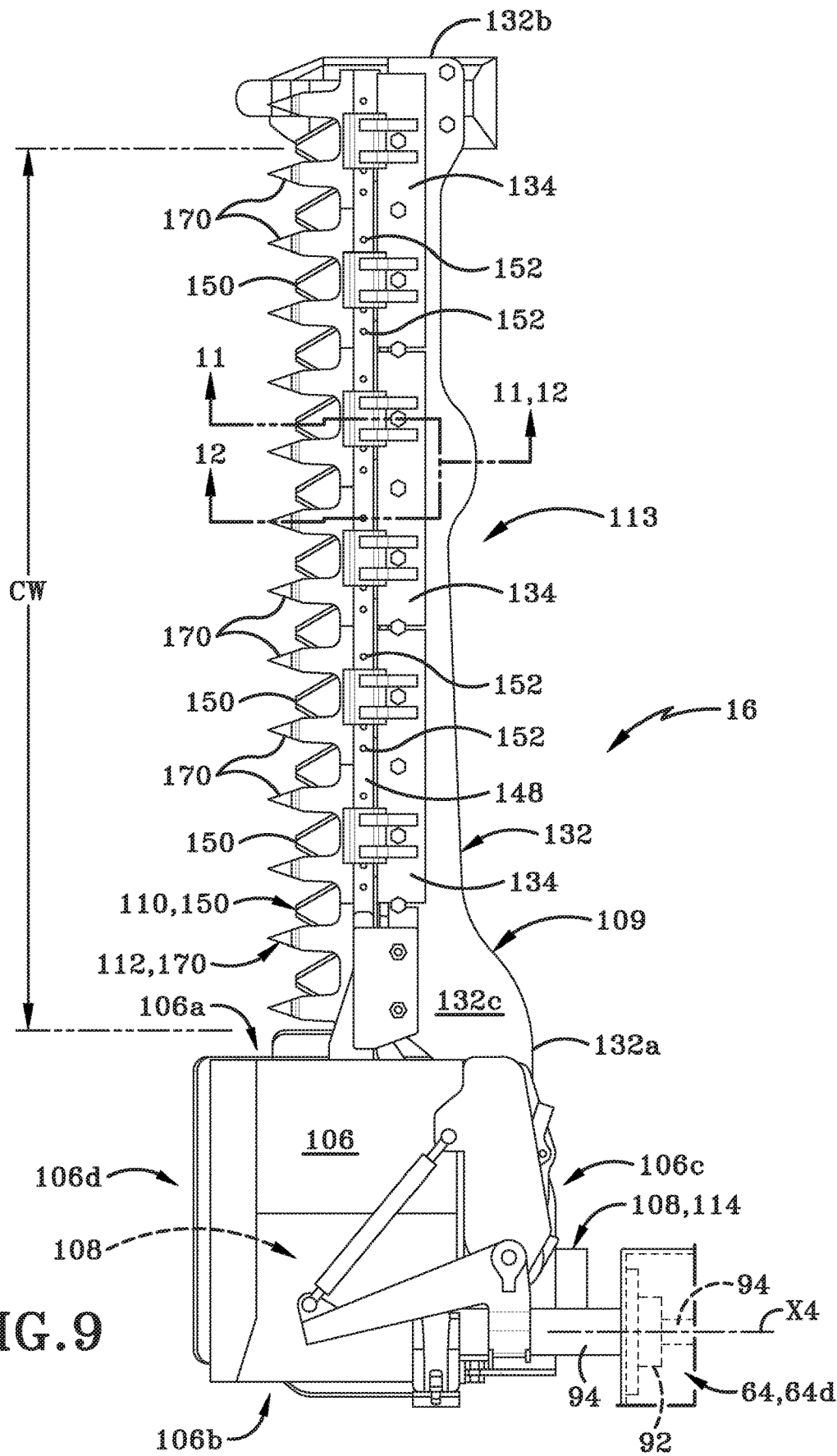
FIG. 9 is a top elevation view of the cutting mechanism of the boom mower with a portion of the boom mower removed.
Figure 10:
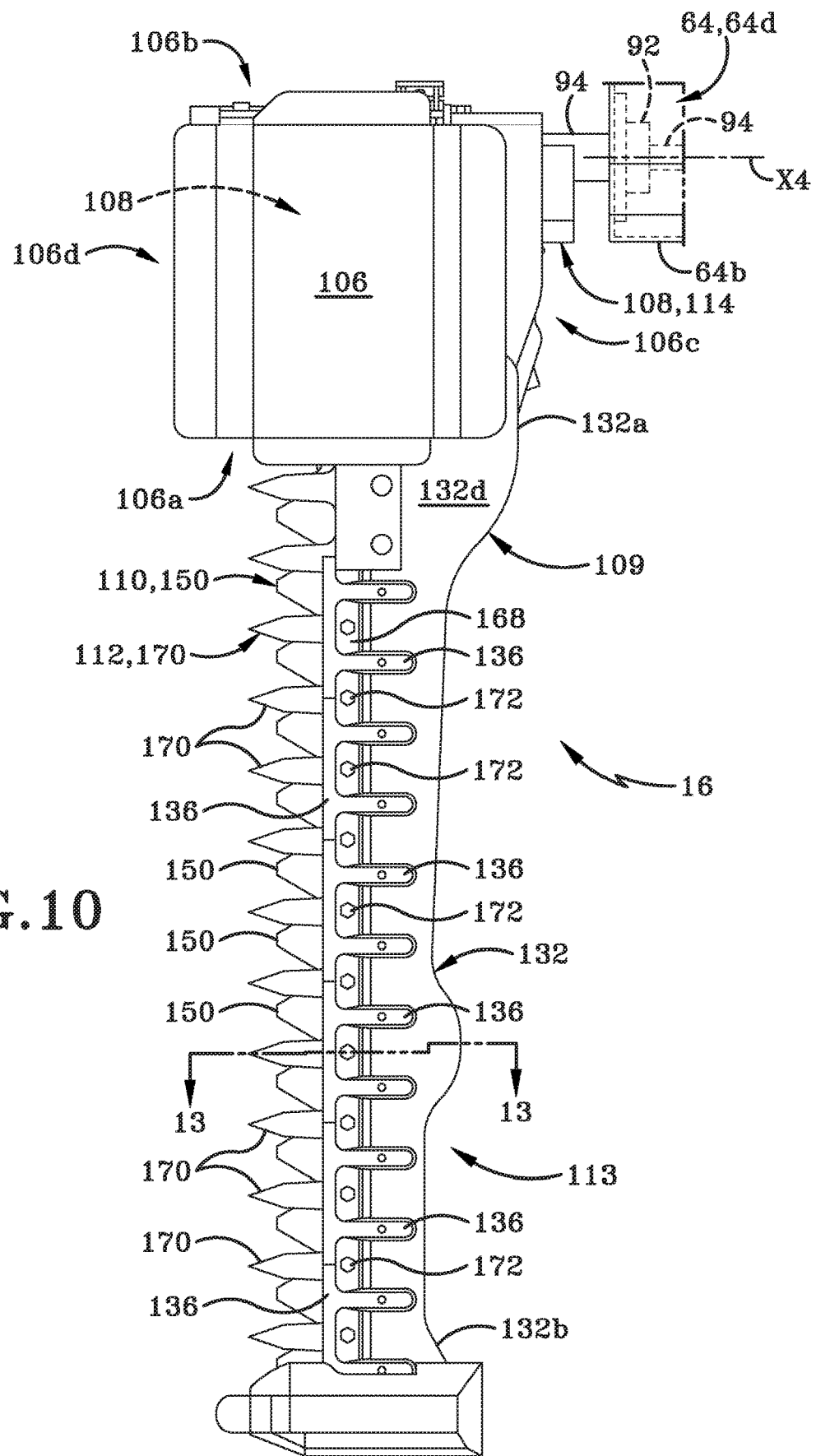
FIG. 10 is a bottom elevation view of the cutting mechanism with a portion of the boom mower removed.

With primary reference to FIG. 7, the second hydraulic piston and cylinder assembly 182 includes a second hydraulic piston and cylinder device 234, a third hydraulic piston and cylinder device 236, and a plurality of mounting brackets 238. The second hydraulic piston and cylinder device 234 includes a cylinder 240 and a piston 242. The cylinder 240 includes a trailing end 244 pivotably connected with a generally transversely extending mounting bracket 238 via a longitudinally extending bolt 246. The piston 242 includes a leading end 248 that is freely connected to the first arm 74 of the mounting bracket 73 proximate the top end 74a of the first arm 74.

The third hydraulic piston and cylinder device 236 includes a cylinder 250 and a piston 252. The cylinder 250 includes a trailing end 254 pivotably connected with a generally transversely extending mounting brackets 238 via a longitudinally extending bolt 256. The piston 252 includes a leading end 258 that is freely connected to the second arm 76 of the mounting bracket 73 proximate the top end 76a of the second arm 76. The third hydraulic piston and cylinder assembly 184 includes a fourth hydraulic piston and cylinder device 260 and a plurality of mounting brackets 262. The fourth hydraulic piston and cylinder device 260 includes a cylinder 264 and a piston 266. The cylinder 264 includes a trailing end 268 pivotably connected with the support beam 70 via mounting brackets 262 and a longitudinally extending bolt 270. The piston 266 includes a leading end 272 that is freely connected to a sleeve 274 which is rotatably connected to the second pivot shaft 82. The shield 67 is operably engaged with the third link member 66 and protects the third translation assembly 67.

With primary reference to FIG. 1, and FIG. 18 through FIG. 23B, the procedures and operations for translating or moving the cutting mechanism 16 vertically, transversely, and in a rotational direction about a rotational axis by moving the boom assembly 14 between a first position FP1 (FIG. 4), which may also be referred to as a retracted position, and a second position SP1 (FIG. 23A and FIG. 23B), which may also be referred to as an extended position, are depicted.

In one particular embodiment, the hydraulic system 33 of the tractor 32 is utilized to effectuate movement of the cutting mechanism 16 generally vertically, generally transversely, and about a rotational axis and the PTO connector 36 of the tractor 32 is utilized to effectuate movement of at least the motor 114, blades 150, and guards 170. In one example, hydraulic system 33 of the tractor 32 is operably engaged with the hydraulic oil diverter valve 35 via electrical wiring 41a. The hydraulic oil diverter valve 35 is operably engaged with the auxiliary hydraulic circuit lines 37a, 37b, and 37c. Auxiliary hydraulic circuit line 37a is operably engaged with fourth hydraulic piston and cylinder device 260 which effects movement of the cutting mechanism 16 in the generally transverse direction, auxiliary hydraulic circuit line 37b is operably engaged with the second hydraulic piston and cylinder device 234 and the third hydraulic piston and cylinder device 236 which effect which effect movement of the cutting mechanism 16 in the generally vertical direction, and auxiliary hydraulic circuit line 37c is operably engaged with the first hydraulic piston and cylinder device 186 which effects movement of the cutting mechanism 16 about the rotational axis. As one having ordinary skill in the art would understand, the hydraulic oil diverter valve 35 diverts hydraulic fluid through hydraulic lines to effectuate the movement of pistons 206, 242, 252, 266 relative to respective cylinders 204, 240, 250, and 264. In one example, the actuation electronics 40, electrical wiring 41b, and the PTO connector 36 of the tractor 32 are operably engaged with a belt-driven hydraulic assembly 276 of the boom mower 10 and are utilized to effectuate the movement of at least the motor 114, blades 150, and guards 170. The hydraulic assembly 276 includes a hydraulic assembly belt 277, a hydraulic assembly pump 278, a hydraulic assembly pulley 279, a hydraulic assembly reservoir 290, a valve assembly (not shown), hydraulic lines (not shown) and any other components necessary for actuating at least the motor 114, blades 150, and guards 170 as one of ordinary skill in the art would understand.

A first hydraulic lever 280, which may also be referred to as a first control, and a second hydraulic lever 282, which may also be referred to as a second control, on tractor 32 are in operative communication with the hydraulic system 33. The first hydraulic lever 280 has multiple functions and includes at least one function switching mechanism 281 that changes the function of the first hydraulic lever 280 when the at least one function switching mechanism 281 is activated. In one particular embodiment, first hydraulic lever has three functions, and the at least one function switching mechanism 281 includes a first function switching mechanism 281a, such as a button also denoted as 281a and a second function switching mechanism 281b, such as a switch also denoted as 281b. In this embodiment, depressing the button 281a changes the function of the first hydraulic lever 280 and activating the switch 281b (e.g., manipulating the switch from an "off" position to an "on" position) changes the function of the first hydraulic lever 280. Therefore, in this embodiment, the first hydraulic lever 280 has three separate and distinct functions. In this embodiment, the first function switching mechanism 281a is provided on the first hydraulic lever 280 and second function switching mechanism 281b is provided on the second hydraulic lever 282; however, the first function switching mechanism 281a and the second function switching mechanism 281b may be provided in any suitable location and/or position.

An alert mechanism 286, such as a light source, is in operable communication with the switch 281b that alerts an operator (not shown) when the switch 281b is activated or in the "on" position. The light source is illuminated to alert the operator. The alert mechanism 286 is provided on the second link member 64 proximate the cutting mechanism 16 such that the operator has a clear line of sight from where an operator is located on tractor 32 when operating the same. By way of non-limiting example, alert mechanism 286 is provided with a clear line of sight from an operator's seat 288 provided on the tractor 32. In other examples, the operator may stand on a platform to operate a utility vehicle upon which the boom mower attachment is engaged. It will be also be understood that alert mechanisms other than lights may be utilized, e.g., audible alerts.

In one particular embodiment, levers 280 and 282 are positioned near the operator's seat 288 such that the operator is able to control the hydraulic fluid to effectuate movement in a secondary device or attachment, such as cutting mechanism 16 of boom mower 10, from the seated position while driving tractor 32. Additionally, movement of the attachment or cutting mechanism 16 of boom mower 10 occurs forwardly from the tractor 32 occurs while the operator is in a safe location rearward from the forward ground engaging wheel on tractor 32, preferably while seated on the operator's seat 288.

Figure 19:
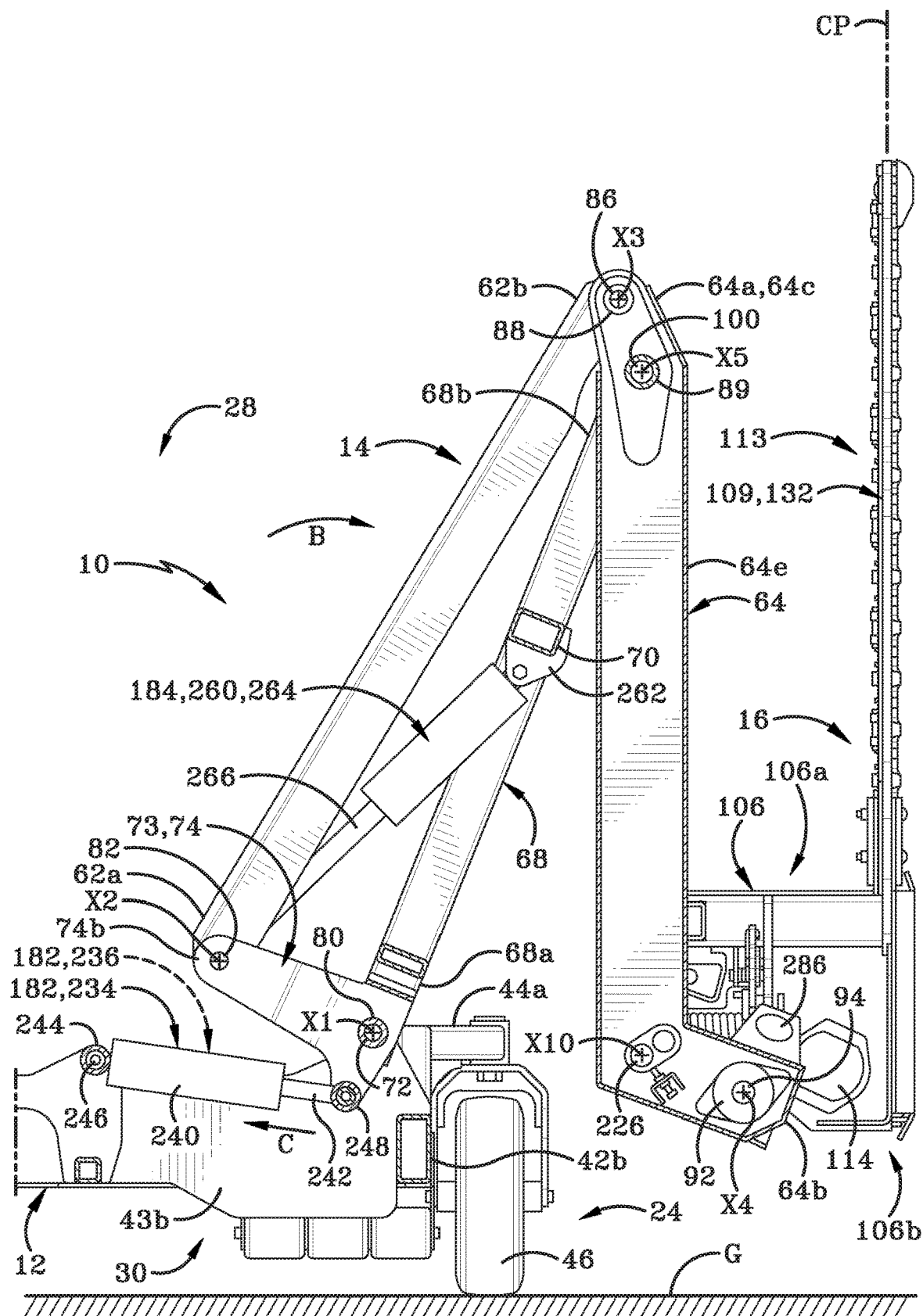
FIG. 19 is a view similar to FIG. 7 with the cutting mechanism shown.

FIG. 18 and FIG. 19 depict movement of the first hydraulic lever 280 in a direction indicated by arrow A (FIG. 18) when the button 280 is not depressed and the switch 281b is not activated which causes movement of the cutting mechanism 16 in the first movement, which is in a general direction shown by arrow B (FIG. 18 and FIG. 19), via the oil diverter valve 35 of the hydraulic system 33 of the tractor 32 diverting hydraulic fluid through auxiliary hydraulic circuit line 37b. FIG. 19 depicts, as hydraulic fluid moves through auxiliary hydraulic circuit line 37b, which is in operative communication with the second hydraulic piston and cylinder device 234 and the third hydraulic piston and cylinder device 236, the pistons 242 and 252 respectively, are drawn into the cylinders 240 and 250 respectively although only the movement of piston 242 into the cylinder 240 is shown in FIG. 19. The linear movement of the piston 242 into the cylinder 240 is indicated by arrow C (FIG. 19). Since the mounting bracket 73 is pivotably connected to the leading end 248 of the piston 242, the mounting bracket 73 rotates about the first pivot axis X1. Since the top end 76a of the first arm 76 of the mounting bracket 73 and the top end 78a of the second arm 78 of the mounting bracket 73 are pivotably connected to the first sleeve 80, and the first sleeve 80 is rotatably connected to the first pivot shaft 72, and since the first end 62a of the first link member 62 is pivotably connected to the first arm 74 and the second arm 76 of the mounting bracket 73 proximate the bottom end 74b of the first arm 74 and the bottom end 76b of the second arm 76 via the second pivot shaft 82, the first link member rotates about the first pivot shaft X1 which causes the rest of the boom assembly 14, including the third link member 66 and the fourth link member 68, which are independently pivotably connected to the first pivot shaft 72 via the sixth sleeve 98 and the seventh sleeve 102 as described above, to rotate in the direction of arrow B (FIG. 18 and FIG. 19).

Figure 20:
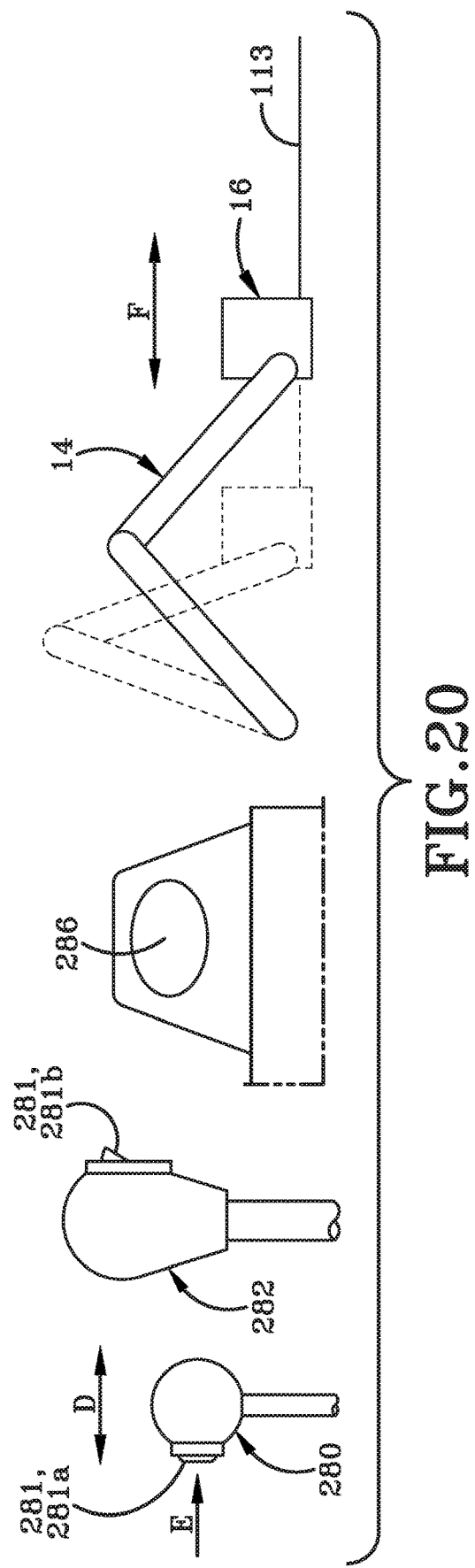
FIG. 20 is an operational diagrammatic view showing movement of the cutting mechanism in accordance with one aspect of the present disclosure.
Figure 21:
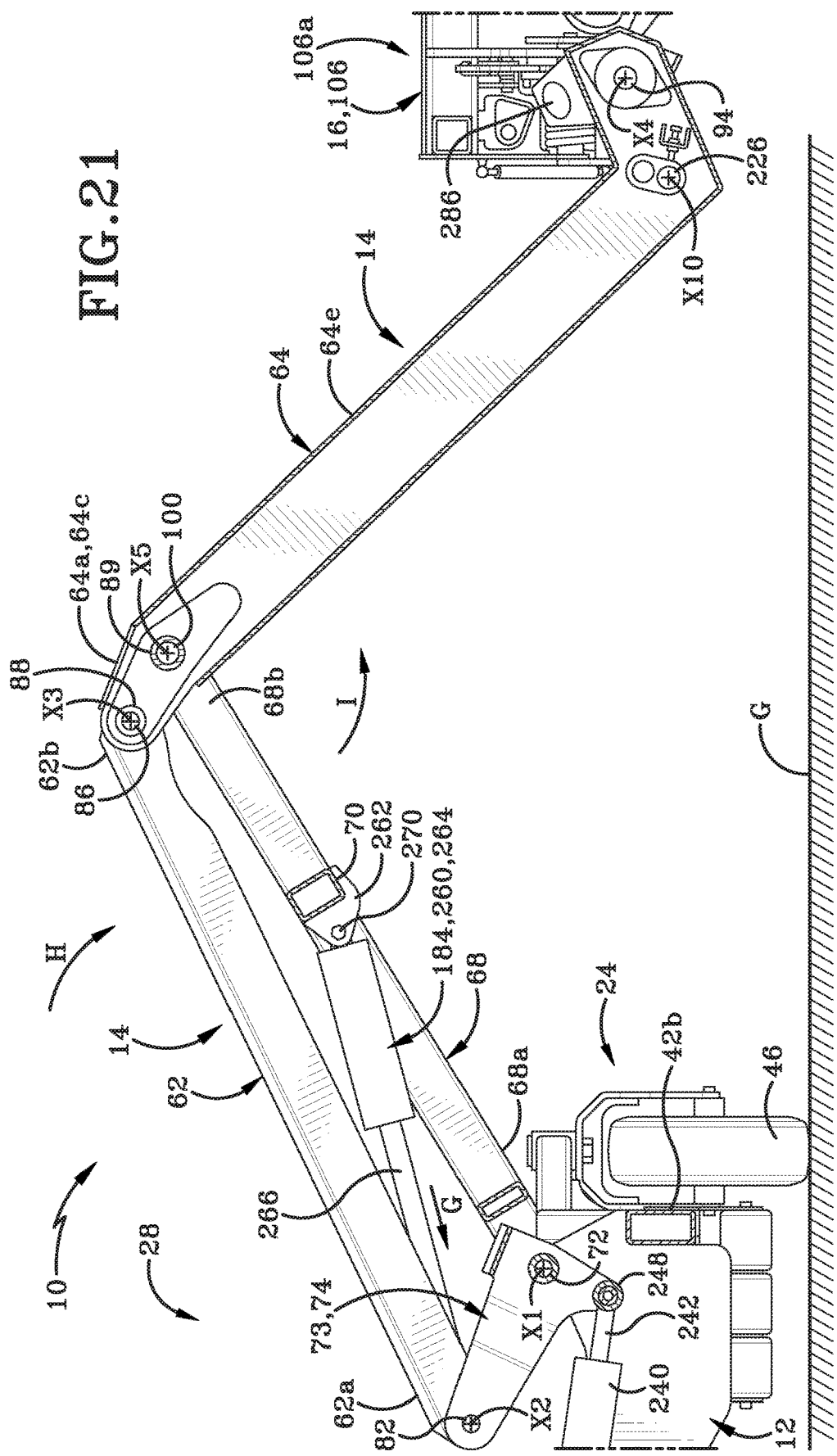
FIG. 21 is a view similar to FIG. 19 with the cutting mechanism moved to a different position.

FIG. 20 and FIG. 21 depict movement of the first hydraulic lever 280 in a direction indicated by arrow D (FIG. 20), which is the same direction indicated by arrow A, when the button 280 is depressed in the direction indicated by arrow E (FIG. 20) and the switch 281b is not activated which causes movement of the cutting mechanism 16 in the second movement, which is in a direction shown by arrow F (FIG. 20), via the oil diverter valve 35 of the hydraulic system 33 of the tractor 32 diverting hydraulic fluid through auxiliary hydraulic circuit line 37a.

FIG. 20 depicts, as hydraulic fluid moves through auxiliary hydraulic circuit line 37a, which is in operative communication with the fourth hydraulic piston and cylinder device 260, the piston 266 is drawn out of the cylinder 264. The linear movement of the piston 266 out of the cylinder 264 is indicated by arrow G (FIG. 21). The linear movement of the piston 266 causes a separation between the first link member 62 on one hand, and with the third link member 66 and the fourth link member 68 on the other hand, which in turn, causes the second link member 64 to rotate about the third pivot axis X3. The separation causes the first link member 62 to exert a pulling force in a direction shown by arrow H (FIG. 21) on the second link member 64 which rotates the second link member 64 about the third pivot axis X3 in a direction shown by arrow I (FIG. 21).

Figure 22:
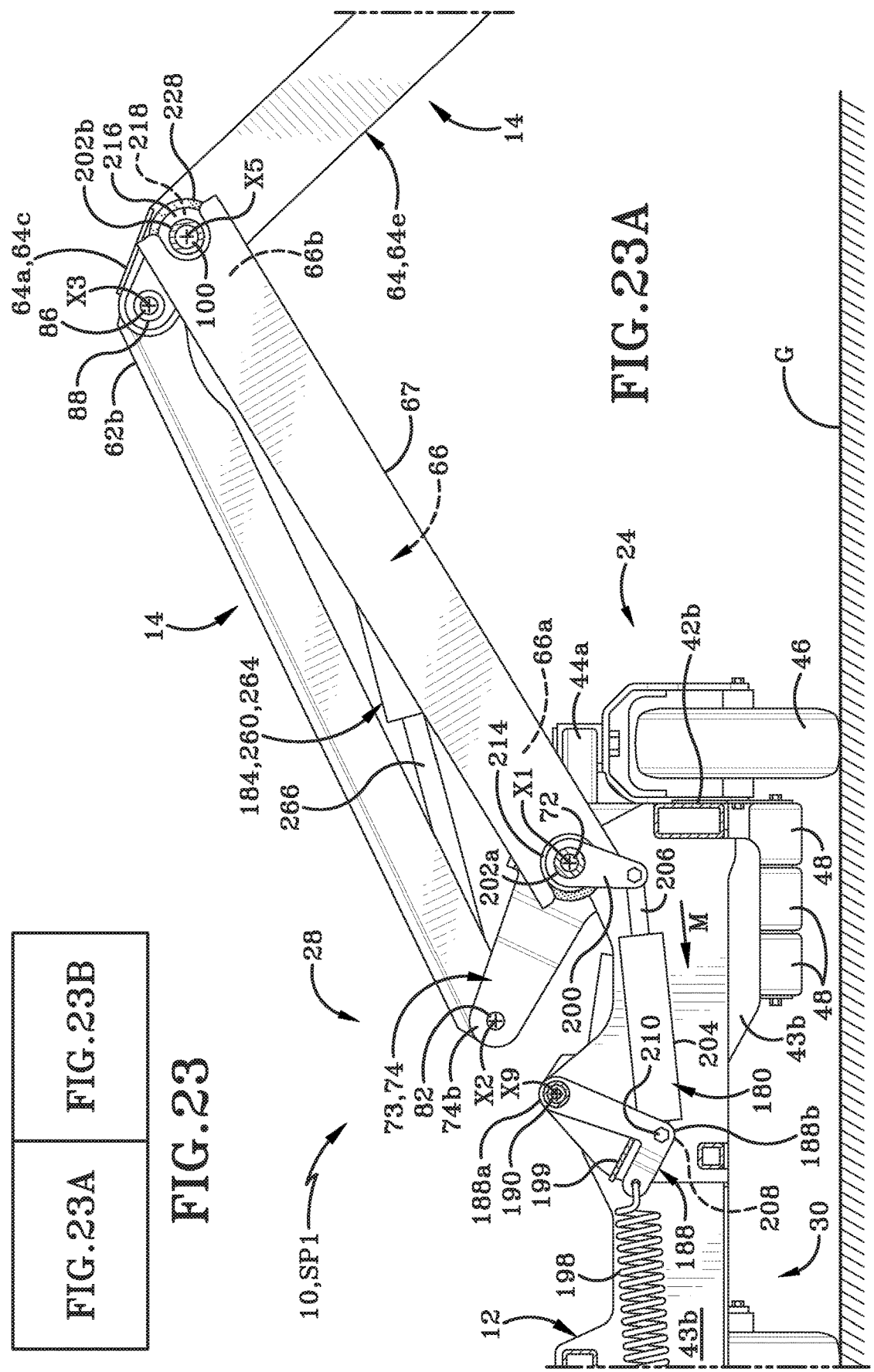
FIG. 22 is an operational diagrammatic view showing movement of the cutting mechanism in accordance with one aspect of the present disclosure.
Figure 23:
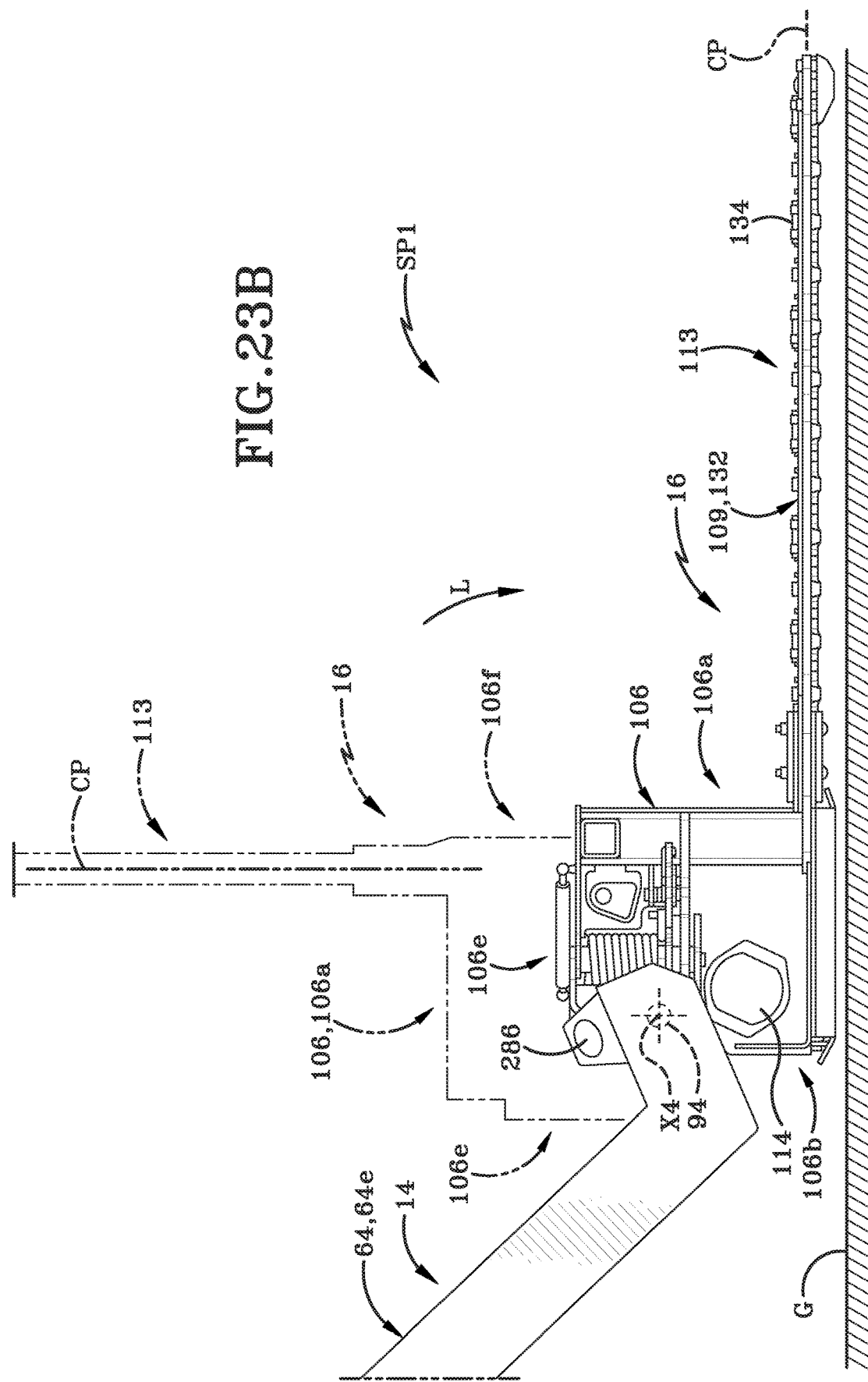
FIG. 23 is partial rear elevation view of the boom mower with a boom assembly in an extended position and a partial rear elevation view of the boom mower showing movement of the cutting mechanism.

FIG. 22, FIG. 23A and FIG. 23B depict movement of the first hydraulic lever 280 in a direction indicated by arrow J (FIG. 22), which is the same direction indicated by arrow A and arrow D, when the button 280 is not depressed and the switch 281b is activated by pressing the switch in a direction indicated by arrow K (FIG. 22), or in the "on" position, and the alert mechanism 286 is activated, which causes movement of the cutting mechanism 16 in the third movement, which is in a direction shown by arrow L (FIG. 22 and FIG. 23B), via hydraulic oil diverter valve 35 of the hydraulic system 33 of the tractor 32 diverting hydraulic fluid through auxiliary hydraulic circuit line 37c.

FIG. 23A and FIG. 23B depict, as hydraulic fluid moves through auxiliary hydraulic circuit line 37c, which is in operative communication with the first hydraulic piston and cylinder device 186, the piston 206 is drawn into the cylinder 204. The linear movement of the piston 206 into the cylinder 204 is indicated by arrow M (FIG. 23A). The linear movement of the piston 266 causes the cutting mechanism 16 to rotate about the fourth pivot axis X4 in a direction shown by arrow L (FIG. 23B). More particularly, the linear movement of the piston 266 causes the first sprocket 214 to rotate about the first pivot axis X1 in a clockwise direction, the second sprocket 216, to rotate about the fifth pivot axis X5 in a clockwise direction, the third sprocket 218 to rotate about the fifth pivot axis X5 in a clockwise direction, the fourth sprocket 220 to rotate about the tenth pivot axis X10 in a clockwise direction, and the sixth sprocket 224 to rotate the fourth pivot axis X4 in a clockwise direction. Likewise, the first chain 228 rotates in a clockwise direction about the first sprocket 214 and the second sprocket 216, the second chain rotates in a clockwise direction about the third sprocket 218 and the fourth sprocket 220, and the third chain 232 rotates in a clockwise direction about the fifth sprocket 222 and the sixth sprocket 224. Since the housing 106 of the cutting mechanism 16 is connected to the fourth pivot shaft 94, the cutting mechanism 16 rotates in a clockwise direction as shown by arrow L (23B). As such, an operator (not shown) sets a selectively adjustable rotational orientation of the cutting mechanism 16 by moving the implement 16 in the third movement. The selectively adjustable rotational orientation of the cutting mechanism 16 remains substantially fixed when the cutting mechanism 16 moves in response to the first movement or second movement as more fully described below. In one particular embodiment, the selectively adjustable rotational orientation of the cutting mechanism 16 includes a range of motion of at least approximately ninety degrees; however, the range of motion may be any suitable range of motion. It is to be understood that the cutting mechanism 16 may rotate in a counterclockwise direction in a similar manner as described above in the reverse direction. In another particular embodiment, cutting mechanism 16 may further include a folding mechanism, such as a latch. Unlatching the folding mechanism allows the cutting mechanism to rotate freely on the fourth pivot shaft 94 about the fourth pivot axis X4 which allows the cutting mechanism 16 to be rotated in the counterclockwise direction such that the cutting plane CP is substantially horizontal relative to the ground G. When the cutting mechanism 16 is in this position, the latch may be reengaged to lock the cutting mechanism 16 in that position, which may aid, among other things, shipment of the boom mower 10 to purchasers of the boom mower 10.

Although the first movement, the second movement, and the third movement have been described as being certain directional movements, it is to be entirely understood that the first movement, the second movement, and the third movement can be other directional movements, depending on the context. Thus, a first movement as discussed earlier herein could be termed a second movement or third movement, a second movement could be termed a first or third movement, and, similarly, a third movement could be termed a first or second movement. In other words, if the first movement has been described herein as a generally vertical movement and the second movement has been described herein as a generally lateral movement, those particular directions (vertical and lateral) may be associated with other names; i.e., the generally lateral movement may be called a first movement and the generally vertical movement may be called a second movement.

Figure 16:
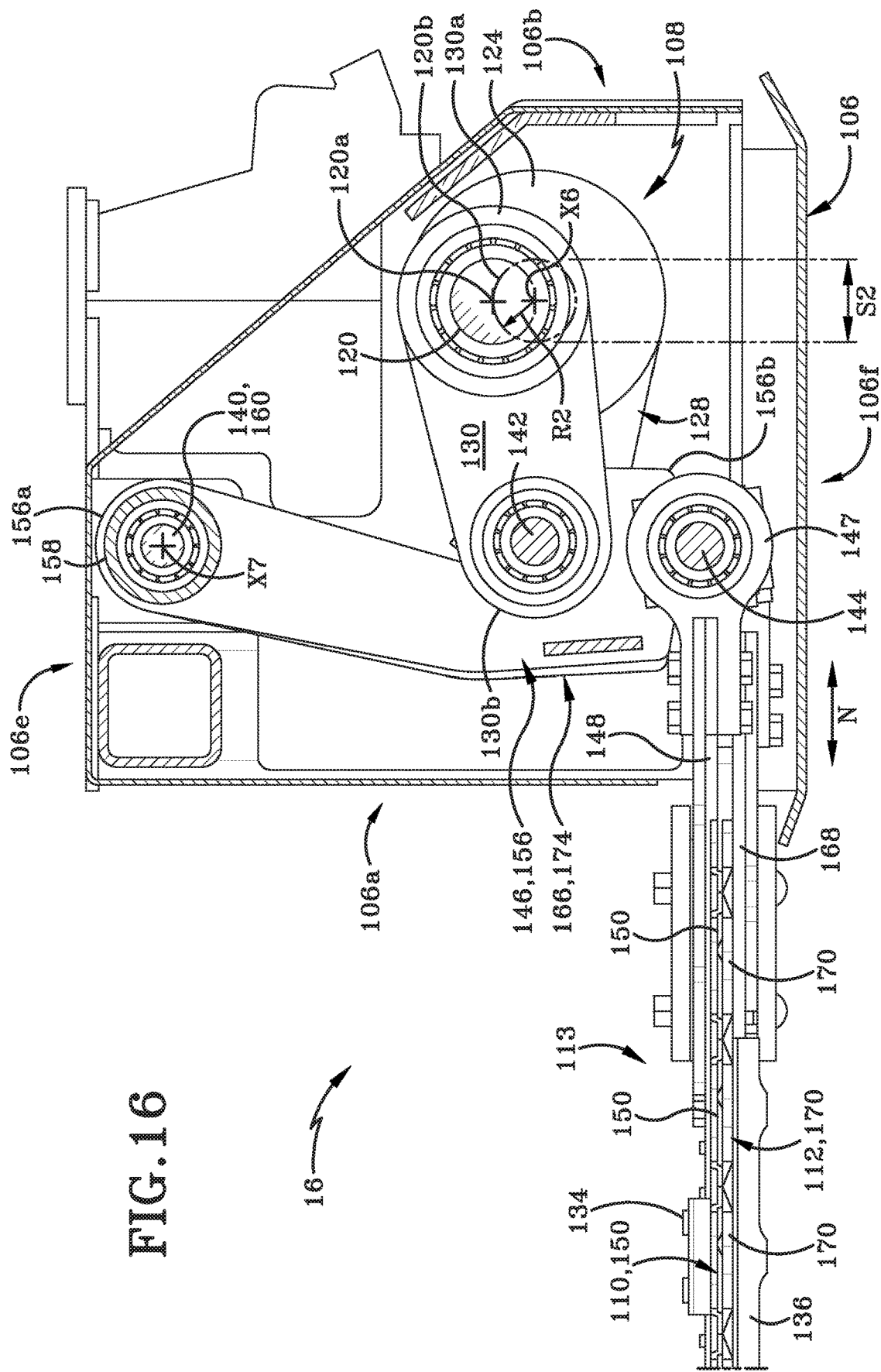
FIG. 16 is a cross section view taken along line 16-16 of FIG. 14.
Figure 17:
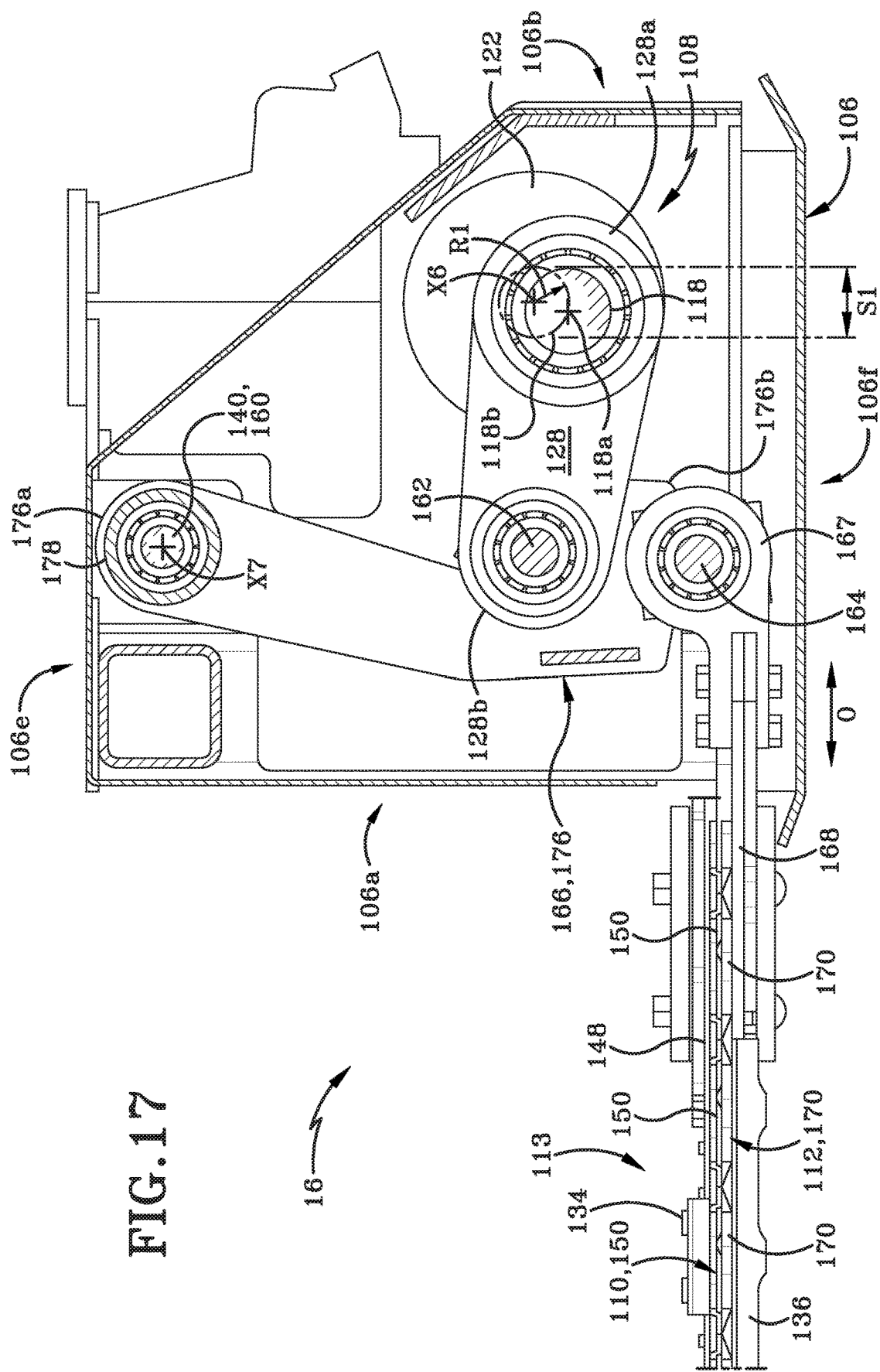
FIG. 17 is a cross section view taken along line 17-17 of FIG. 14.

Now that the procedures and operations for translating or moving the cutting mechanism 16 in at least a first movement, a second movement, and a third movement have been described, the operation of the cutting mechanism 16 will be described. The motor 114 drives the drive shaft 116a, the end shaft 116b, the first crankshaft 118, the second crankshaft 120, the first crankshaft plate 122, the second crankshaft plate 124, the third crankshaft plate 126, the first crankshaft rod 128, and the second crankshaft rod 130. The first end 128a of the first crankshaft rod 128 and the first crankshaft 118 rotate in a path of rotation 118b about the sixth pivot axis X6. A diameter of the path of rotation 118b defines a first reciprocal stroke distance S1 (FIG. 17). The first end 130a of the second crankshaft rod 130 and the second crankshaft 120 rotate in a path of rotation 120b about the sixth pivot axis X6. A diameter of the path of rotation 120b defines a second reciprocal stroke distance S2 (FIG. 16).

The first blade rocker arm 154 and the second blade rocker arm 156 are connected to the second crankshaft rod 130 via the second blade assembly shaft 142 proximate the bottom 154b of the first blade rocker arm 154 and the bottom 156b of the second blade rocker arm 156. The first blade rocker arm 154 and the second blade rocker arm 156 are connected to the blade plate 148 via the third blade assembly shaft 144. The blade plate 148 extends longitudinally within the space 138 defined by the main frame 132, the top cover 134, and the bottom cover 136. The blade plate 148 is connected to the plurality of blades 150 via the plurality of fastening mechanisms 152. The drive assembly 108 reciprocates at least one blade of the plurality of blades 150 or at least one guard of the plurality of guards 170. More particularly, the movement of the first crankshaft rod 128 causes the blades 150 to move in a direction indicated by arrow N (FIG. 16) in a reciprocating manner covering the stroke distance S2. The first guard rocker arm 174 and the second guard rocker arm 176 are connected to the first crankshaft rod 128 via the second guard assembly shaft 162 proximate the bottom 174b of the first guard rocker arm 174 and the bottom 176b of the second guard rocker arm 176. The first guard rocker arm 174 and the second guard rocker arm 176 are connected to the guard plate 168 via the third guard assembly shaft 164. The guard plate 168 extends longitudinally within the space 138 defined by the main frame 132, the top cover 134, and the bottom cover 136. The guard plate 168 is connected to the plurality of guards 170 via the plurality of fastening mechanisms 172. The movement of the second crankshaft rod 130 causes the guards 170 to move in a direction indicated by arrow O (FIG. 17) in a reciprocating manner covering the second stroke distance S1. As such, the blades 150 and the guards 170 both move in a reciprocating manner and since the blades 150 have a different mass relative to the guards 170, the stroke distances S1 and S2 are optimized to reduce translation of vibration from the cutting mechanism 16 to the frame 12 of the boom mower 10 and, in turn, to the tractor 32. The reciprocating movement of the blades 150 and the guards 170 cause a shearing force along a cutting plane "CP". In one example, the cutting plane "CP" has rotational range of at least approximately one hundred thirty five degrees. In one example, the rotational range of the cutting plane "CP" is between approximately ninety degrees relative to horizontal and negative forty-five degrees below horizontal. In one example, a cutting width "CW" of the cutting plane is approximately thirty-nine inches.

As described above, the cutting mechanism 16 is moveable in the first movement, the second movement, and the third movement. The first movement, the second movement, and the third movement of the cutting mechanism 16 allow the cutting mechanism 16 to move through a range of positions. For example, and not meant as a limitation, when the cutting mechanism 16 has a rotational orientation that is ninety degrees relative to horizontal, the cutting plane "CP" can reach a vertical height equal to at least approximately one hundred forty-two inches from the ground "G".

In another non-limiting example, when the cutting mechanism has a rotational orientation that is zero degrees relative to horizontal, the cutting plane "CP" can reach a vertical height equal to approximately eighty two inches from the ground "G". In another non-limiting example, when the cutting mechanism 16 has a rotational orientation of zero degrees relative to horizontal, the cutting plane "CP" can reach a transverse horizontal distance of at least approximately one hundred fifteen inches from an outside portion of the at least one ground engaging wheel 34 of the tractor 32. One of the benefits of being able to move the cutting mechanism 16 in the first movement, the second movement, and the third movement, is that the cutting mechanism 16 can be utilized to mow and/or maintain vegetation along steep ditches, under fences and guardrails, along ponds, lakes, and streams, along trails, pathways or roadways, or any other suitable location.

In accordance with one aspect of the present disclosure, the boom mower 10 in combination with the tractor 32 may form an implement control system 300. The implement control system 300 may include a control, which may be the first hydraulic lever 280, at least one function switching mechanism, which may be the button 281a and/or the switch 281b, and an implement, which may be the cutting mechanism 16.

The first hydraulic lever 280 may indirectly move the implement 16 in a first mode, a second mode, and a third mode by only using two motions of the first hydraulic lever 280. The control motion in the first mode is associated with a first movement of the implement 16, the control motion in the second mode is associated with a second movement of the implement 16, and the control motion in the third mode is associated with a third movement of the implement 16.

The at least one function switching mechanism 281a and 281b allow the first hydraulic lever 280 to move the implement 16 between the second mode, and the third mode. The first hydraulic lever 280 may be movable between a first position and a second position. In one example, activating the button 281a allows the first hydraulic lever 280 to cause the implement 16 to move in one or more of the (i) the second mode; and (ii) the third mode. In another example, activating the switch 281b allows the first hydraulic lever 280 to cause the implement 16 to move in one or more of (i) the second mode; and (ii) the third mode.

The implement control system 300 may further include an alert mechanism 286 that indicates when the first hydraulic lever 280 is operating in one or more of (i) the second mode; and (ii) the third mode. In one example, the alert mechanism 286 is an indicator light on the implement that is by an operator while controlling the control; wherein the indicator light is illuminated to indicate to the operator that the control is operating in one or more of (i) the second mode; and (ii) the third mode.

The implement control system 300 may further include a first end and a second end defining a longitudinal direction therebetween, a first side and a second side defining a transverse direction therebetween, a top and a bottom defining a vertical direction therebetween, and a longitudinal center axis $X_C$, which, in one example, may be the first end 20, second end 22, first side 24, second side 26, top 28, bottom 30 and longitudinal center axis $X_C$ of the boom mower 10.

In one example, the first movement associated with the first mode is a generally vertical movement relative to the longitudinal center axis $X_C$, the second movement associated with the second mode is a generally transverse movement relative to the longitudinal center axis $X_C$, and the third movement associated with the third mode is a rotational movement about a rotational axis that is offset parallel to the longitudinal center axis $X_C$. In one example, a rotational orientation of the implement 16 relative to the rotational axis may be selected or set by moving the implement 16 in the third mode. The rotational orientation of the implement remains substantially fixed, i.e., substantially unchanged, when the implement moves in one or more of the (i) the first mode; and (ii) the second mode. As such, as the implement mechanism 16 moves in the transverse direction, the implement from the ground "G".

Figure 24:
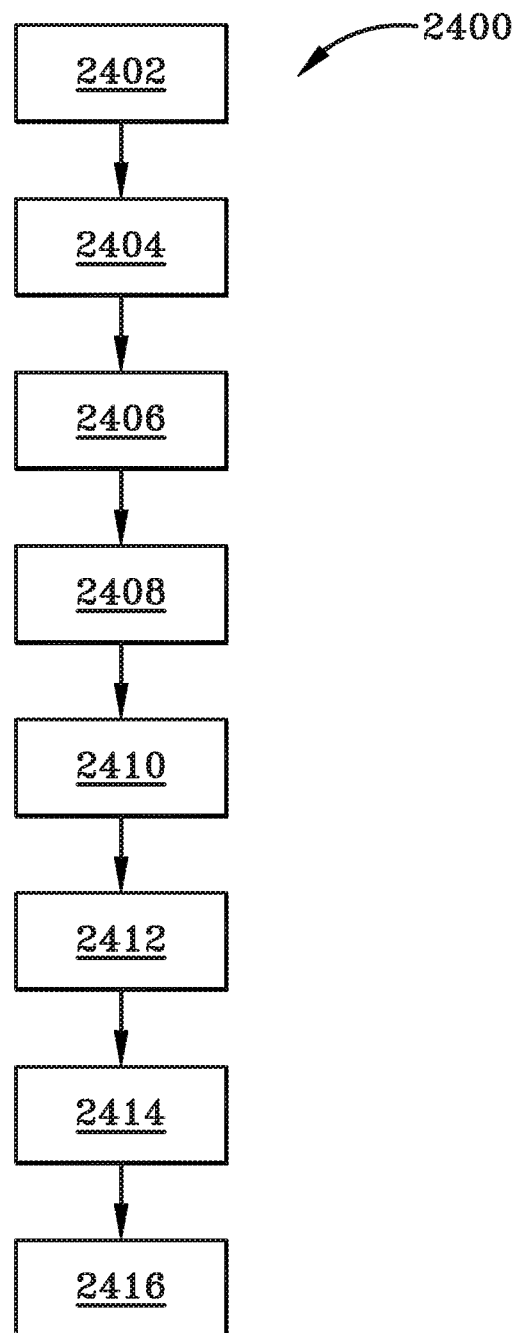
FIG. 24 is a flow chart of one method or process in accordance with the present disclosure.

FIG. 24 depicts an exemplary method or process in accordance with one aspect of the present disclosure and is generally referred to as 2400. The method 2400 includes moving a control, which may be the first hydraulic lever 280, of an implement control system 300 between a first position and a second position to cause an implement 16 to move in a first movement, which is generally shown at 2402. The method 2400 may include switching, via at least one function switching mechanism 281a, 281b, a function of the first hydraulic lever 280 from the first mode to at least one of (i) a second mode; and (ii) a third mode, which is shown generally at 2404. The method 2400 may include moving the first hydraulic lever 280 between the first position and the second position in the at least one of (i) the second mode; and (ii) the third mode, which is shown generally at 2406. In one example, the control movement in the first mode is associated with a first movement of the implement 16, the control movement in the second mode is associated with a second movement of the implement 16, and the control movement in the third mode is associated with a third movement of the implement 16.

In one example, the at least one function switching mechanism 281 is a button 281a and switching the function of the first hydraulic lever 280 from the first mode to at least one of (i) the second mode; and (ii) the third mode is accomplished by depressing the button 281a, which is shown generally at 2408.

In another example, the at least one function switching mechanism 281 is a switch 281b and switching the function of the first hydraulic lever 280 from the first mode to at least one of (i) the second mode; and (ii) the third mode is accomplished by activating the switch 281b, which is shown generally at 2410.

In another example, the at least one function switching mechanism 281 is a button 281a and a switch 281b and switching the function of the first hydraulic lever 280 to the second mode is accomplished by depressing the button 281a and switching the function of the first hydraulic lever 280 to the third mode is accomplished by activating the switch 281b, which is shown generally at 2412.

The method 2400 may include indicating, via an alert mechanism 286, when the function of the first hydraulic lever 280 has been switched via the function switching mechanism 281a, 281b to at least one of (i) the second mode; and (ii) the third mode, which is shown generally at 2414. In one example, the alert mechanism 286 is an indicator light also denoted 286, and the method 2400 further includes illuminating the indicator light 286 when the function of the first hydraulic lever 280 has been switched via the at least one function switching mechanism 281*a*, 281*b* to at least one of (i) the second mode; and (ii) the third mode, which is shown generally at 2416.

In one example, the first movement associated with the first mode is a generally vertical movement relative to the longitudinal center axis $X_C$, the second movement associated with the second mode is a generally transverse movement relative to the longitudinal center axis $X_C$, and the third movement associated with the third mode is a rotational movement about a rotational axis that is offset parallel to the longitudinal center axis $X_C$. The rotational orientation of the implement remains substantially fixed when the implement 16 moves in at least one of (i) the first mode; and (ii) the second mode.

While the hydraulic cylinders and pistons have been disclosed herein and illustrated in the figures in a particular orientation, it will be understood that the positions of the cylinders and pistons may be swapped. For example, in FIG. 6 the cylinder 204 is shown engaged with the pivot arm 188 and the piston 206 is shown engaged with the hanger bracket 200. In another example, however, the cylinder 204 may be engaged with the hanger bracket 200 and the piston 206 may be engaged with the pivot arm 188.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A utility vehicle comprising:
   a vehicle frame having a front and a back;
   a plurality of ground-engaging wheels provided on the frame;
   a control lever provided on the vehicle in a position accessible to an operator;
   a cutting mechanism coupled with the vehicle frame;
   at least one translation assembly that moves the cutting mechanism in a first movement, a second movement, and a third movement; and wherein the control lever actuates the at least one translation assembly; and
   an alert mechanism that indicates to the operator that the control lever is moving the cutting mechanism in one of the second movement and the third movement.

2. The utility vehicle of claim 1, wherein the cutting mechanism is positioned forwardly of the front of the vehicle frame.

3. The utility vehicle of claim 1, wherein the alert mechanism is an indicator light mounted on the cutting mechanism.

4. The utility vehicle of claim 1, further comprising:
   a boom assembly that connects the cutting mechanism to the vehicle frame.

5. The utility vehicle of claim 4, wherein the boom assembly is movable between an expanded position and a retracted position.

6. The utility vehicle of claim 1, wherein a rotational orientation of the cutting mechanism remains substantially constant regardless of whether the cutting mechanism is moved vertically or transversely.

7. The utility vehicle of claim 5, wherein the boom assembly comprises at least a first link member and a second link member that are pivotally engaged with each other.

8. The utility vehicle of claim 1, further comprising:
a function switching mechanism operably engaged with the control lever.

9. The utility vehicle of claim 1, wherein the function switching mechanism is one of a button and a switch.

10. The utility vehicle of claim 1, wherein the utility vehicle is a compact tractor.

11. A method of cutting or mowing vegetation comprising:
mounting a boom mower attachment to a utility vehicle;
operatively engaging a single control on the utility vehicle with the boom mower attachment;
moving a cutting mechanism on the boom mower attachment in a first movement, a second movement, and a third movement relative to the boom mower frame utilizing the single control;
actuating the cutting mechanism;
cutting or mowing vegetation using the actuated cutting mechanism;
moving at least one blade of the cutting mechanism through a first distance; and
moving at least one guard of the cutting mechanism through a second distance.

12. The method of claim 11, further comprising:
moving the control between a first position and a second position in a first mode to cause the cutting mechanism to move in the first movement;
switching, via at least one function switching mechanism, a function of the control from the first mode to at least one of (i) a second mode; and (ii) a third mode; and
moving the control between the first position and the second position in at least one of (i) the second mode; and (ii) the third mode; wherein the control movement in the second mode is associated with the second movement of the cutting mechanism; and wherein the control movement in the third mode is associated with the third movement of the cutting mechanism.

13. The method of claim 11, further comprising:
optimizing the first distance and the second distance to reduce translation of vibration from the cutting mechanism to the boom mower frame.

14. A method of cutting or mowing vegetation comprising:
mounting a boom mower attachment to a utility vehicle;
operatively engaging a single control on the utility vehicle with the boom mower attachment;
moving a cutting mechanism on the boom mower attachment in a first movement, a second movement, and a third movement relative to the boom mower frame utilizing the single control;
actuating the cutting mechanism;
cutting or mowing vegetation using the actuated cutting mechanism; and
alerting an operator on the utility vehicle when the cutting mechanism is performing one of the second movement and the third movement.

15. The method of claim 14, wherein the alerting of the operator includes:
illuminating a light provided on the cutting mechanism.

16. The method of claim 14, further comprising:
setting a rotational orientation of the cutting mechanism.

17. The method of claim 16, further comprising:
maintaining the rotational orientation of the cutting mechanism while moving the cutting mechanism in a generally vertical direction.

18. The method of claim 16, further comprising:
maintaining the rotational orientation of the cutting mechanism while moving the cutting mechanism in a generally transverse direction.

19. The method of claim 14, further comprising:
moving the control between a first position and a second position in a first mode to cause the cutting mechanism to move in the first movement;
switching, via at least one function switching mechanism, a function of the control from the first mode to at least one of (i) a second mode; and (ii) a third mode; and
moving the control between the first position and the second position in at least one of (i) the second mode; and (ii) the third mode; wherein the control movement in the second mode is associated with the second movement of the cutting mechanism; and wherein the control movement in the third mode is associated with the third movement of the cutting mechanism.

* * * * *